United States Patent
Ebisawa et al.

(10) Patent No.: US 9,236,698 B2
(45) Date of Patent: Jan. 12, 2016

(54) CONTACT AND CONNECTOR HAVING A PAIR OF CONDUCTIVE MEMBERS AND A BIASING MEMBER BIASING THE PAIR OF CONDUCTIVE MEMBERS TOWARD EACH OTHER

(75) Inventors: Takeshi Ebisawa, Tokyo (JP); Katsuhiko Nakazawa, Tokyo (JP)

(73) Assignee: Japan Aviation Electronics Industry, Limited, Tokyo (JP)

(*) Notice: Subject to any disclaimer, the term of this patent is extended or adjusted under 35 U.S.C. 154(b) by 98 days.

(21) Appl. No.: 14/113,274

(22) PCT Filed: Nov. 14, 2011

(86) PCT No.: PCT/JP2011/076165
§ 371 (c)(1),
(2), (4) Date: Oct. 22, 2013

(87) PCT Pub. No.: WO2013/001672
PCT Pub. Date: Jan. 3, 2013

(65) Prior Publication Data
US 2014/0051308 A1    Feb. 20, 2014

(30) Foreign Application Priority Data
Jun. 27, 2011   (JP) .................. 2011-141575

(51) Int. Cl.
*H01R 13/64* (2006.01)
*H01R 24/76* (2011.01)
(Continued)

(52) U.S. Cl.
CPC .............. *H01R 24/76* (2013.01); *H01R 4/4863* (2013.01); *H01R 13/15* (2013.01); *H01R 13/6315* (2013.01); *H02B 11/04* (2013.01)

(58) Field of Classification Search
CPC ........ H01R 13/631; H01R 11/24; H02G 5/08; H02B 11/04; H01H 1/0015; H01H 1/42
USPC ........... 439/249, 251, 819, 822; 200/249, 255
See application file for complete search history.

(56) References Cited

U.S. PATENT DOCUMENTS 2,793,355 A * 5/1957 Randall et al. ................ 439/626
2,872,659 A 2/1959 Wills
(Continued)

FOREIGN PATENT DOCUMENTS

GB   2 268 843 A    1/1994
JP   S52-44369 U    3/1977
(Continued)

OTHER PUBLICATIONS

European Search Report in European Application No. 11868740.9, mailed Oct. 6, 2014.
(Continued)

*Primary Examiner* — Thanh Tam Le
(74) *Attorney, Agent, or Firm* — Collard & Roe, P.C.

(57) ABSTRACT

A contact comprises a pair of conductive members and a biasing member attached between the pair of conductive members and biasing the pair of conductive members toward each other. The pair of conductive members each have a base portion and an attaching portion. The base portion of one of the conductive members and the base portion of the other conductive member are disposed spaced apart from each other. At least one of the pair of conductive members has a support portion extending from the base portion toward the other conductive member and abutting against the other conductive member to support the other conductive member.

10 Claims, 18 Drawing Sheets

(51) Int. Cl.
 *H01R 13/15* (2006.01)
 *H01R 4/48* (2006.01)
 *H01R 13/631* (2006.01)
 *H02B 11/04* (2006.01)

(56) References Cited

U.S. PATENT DOCUMENTS

| | | | | |
|---|---|---|---|---|
| 3,171,709 | A | * | 3/1965 | Groody .................... 439/838 |
| 3,427,419 | A | * | 2/1969 | Findley, Jr. ................ 200/255 |
| 3,566,335 | A | * | 2/1971 | Powell .................... 439/251 |
| 3,723,940 | A | * | 3/1973 | Leonard ................... 439/251 |
| 3,845,523 | A | * | 11/1974 | Mayberry ................. 24/134 P |
| 4,121,067 | A | * | 10/1978 | Rexroad et al. ............ 200/50.27 |
| 4,445,732 | A | * | 5/1984 | Wafer ....................... 439/38 |
| 4,555,604 | A | * | 11/1985 | Maier et al. ................ 200/255 |
| 5,041,028 | A | * | 8/1991 | Stohle ..................... 439/822 |
| 5,098,318 | A | | 3/1992 | Suter |
| 5,167,529 | A | * | 12/1992 | Verge ....................... 439/504 |
| 5,928,022 | A | * | 7/1999 | Moeller .................... 439/197 |
| 8,672,717 | B2 | * | 3/2014 | Li et al. ................... 439/822 |
| 2006/0035492 | A1 | | 2/2006 | Sekido |
| 2015/0133003 | A1 | | 5/2015 | Ebisawa |

FOREIGN PATENT DOCUMENTS

| | | |
|---|---|---|
| JP | 62-131333 U | 8/1987 |
| JP | S62-131333 U | 8/1987 |
| JP | 63-152173 U | 10/1988 |
| JP | 02-123714 A | 5/1990 |
| JP | 10-294140 A | 11/1998 |
| JP | 2003-346956 A | 12/2003 |
| JP | 2009-218063 A | 9/2009 |

OTHER PUBLICATIONS

International Search Report of PCT/JP2011/076165, mailed Feb. 7, 2012.

* cited by examiner

CONTACT AND CONNECTOR HAVING A PAIR OF CONDUCTIVE MEMBERS AND A BIASING MEMBER BIASING THE PAIR OF CONDUCTIVE MEMBERS TOWARD EACH OTHER

CROSS REFERENCE TO RELATED APPLICATIONS

This application is the National Stage of PCT/JP2011/076165 filed on Nov. 14, 2011, which claims priority under 35 U.S.C. §119 of Japanese Application No. 2011-141575 filed on Jun. 27, 2011, the disclosures of which are incorporated by reference. The international application under PCT article 21(2) was not published in English.

TECHNICAL FIELD

This invention relates to a contact and a connector and, in particular, relates to a contact and a connector which are used for power supply.

BACKGROUND ART

Conventionally, as shown in FIGS. 17 and 18, there is known a contact 300 comprising a pair of elongated conductive segments 310 vertically spaced apart from each other and spring means 320 attached between the elongated conductive segments 310 and biasing the elongated conductive segments 310 toward each other, thereby holding inserted connection objects 330 between the elongated conductive segments 310 (see, e.g. Patent Document 1).

In this conventional contact 300, vertical displacement limiting shafts 340 are loosely inserted through holes 311 formed in the elongated conductive segments 310, thereby restricting the vertical displacement amount of the elongated conductive segments 310 and supporting the elongated conductive segments 310. As shown in FIG. 18, both ends of the vertical displacement limiting shafts 340 are joined to and supported by frames 350 disposed parallel to the elongated conductive segments 310.

PRIOR ART DOCUMENT

Patent Document

Patent Document 1: JP-A-2009-218063

SUMMARY OF THE INVENTION

Problem to be Solved by the Invention

However, in the conventional contact 300, there has been a problem that since the vertical displacement limiting shafts 340 and the frames 350 are required as support means for supporting the elongated conductive segments 310 facing and spaced apart from each other, the number of components is large and the workload for assembly is large.

Further, in the conventional contact 300, there has been a problem that since the holes 311 should be formed in the elongated conductive segments 310 in order to support the elongated conductive segments 310 by the vertical displacement limiting shafts 340, it is difficult to reduce the vertical dimension of the elongated conductive segments 310 due to the formation of the holes 311.

Therefore, this invention aims to solve the conventional problems, that is, it is an object of this invention to provide a contact and a connector which have a small number of components, reduce the workload for assembly, and achieve miniaturization of the contact.

Means for Solving the Problem

In order to solve the problem, according to this invention, there is provided a contact comprising a pair of conductive members and a biasing member attached between the pair of conductive members and biasing the pair of conductive members toward each other, the contact adapted to be connected to a connection object inserted between the pair of conductive members by holding the connection object therebetween, wherein the pair of conductive members each have a base portion and an attaching portion formed at the base portion and attached with the biasing member, wherein the base portion of one of the conductive members and the base portion of the other of the conductive members are disposed spaced apart from each other, and wherein at least one of the pair of conductive members has a support portion extending from the base portion toward the other of the conductive members and abutting against the other of the conductive members to support the other of the conductive members.

The pair of conductive members each may have a first contact portion for contact with the connection object and a second contact portion for contact with another connection object. The second contact portion is formed on a side opposite to the first contact portion with respect to the attaching portion. The first contact portion of one of the conductive members and the first contact portion of the other of the conductive members face each other in a biasing direction of the biasing member. The second contact portion of one of the conductive members and the second contact portion of the other of the conductive members face each other in the biasing direction.

The pair of conductive members each may have a movement restricting portion that abuts against a portion of the other of the conductive members in a direction different from the biasing direction to thereby restrict relative movement between the pair of conductive members in the direction different from the biasing direction.

At least one of the pair of conductive members may have a hole formed therethrough in the biasing direction, wherein the other of the conductive members has a protruding portion inserted into the hole in the biasing direction, and wherein an inner surface of the hole and an outer surface of the protruding portion serve as the movement restricting portions.

The pair of conductive members may have the same shape.

The pair of conductive members may be formed of a metal or an alloy having a conductivity of 50% or more assuming that a conductivity of pure copper is 100%.

The conductive members each may have a shape with no overlapping portion when developed on a plane.

The pair of conductive members may be formed so that, as seen in the biasing direction of the biasing member, the attaching portions are located within a region defined by connecting outermost points, with respect to the attaching portion, of abutting portions between the pair of conductive members in a state where no connection object is held by the contact.

The pair of conductive members may be formed so that, as seen in the biasing direction of the biasing member, the attaching portions are located within a region defined by connecting outermost points, with respect to the attaching portion, of abutting portions between the pair of conductive members and the second contact portion in a state where the connection object is held between the second contact portions.

The pair of conductive members may be formed so that, as seen in the biasing direction of the biasing member, the attaching portions are located within a region defined by connecting outermost points, with respect to the attaching portion, of abutting portions between the pair of conductive members and the first contact portion in a state where the another connection object is held between the first contact portions.

A connector of the present invention comprises said contact in order to the problem mentioned above.

Effect of the Invention

According to this invention, since a conductive member is formed with a support portion that supports another conductive member against a biasing force of a biasing member, it is possible to maintain the three-dimensional shape of a contact after assembly thereof without requiring an additional member and therefore it is possible to reduce the number of components.

Further, assembly of a contact is achieved only by an operation of adjusting the relative posture of a pair of conductive members after attaching a biasing member to the pair of conductive members so that a support portion formed in one of the conductive members abuts against a predetermined portion of the other conductive member. Therefore, it is possible to reduce the workload for the assembly of the contact.

Further, since a support structure in which support shafts are inserted through holes formed in conductive members, as required in the prior art, is not required, it is possible to reduce the dimension of the conductive members in a biasing direction and thus to achieve miniaturization of a contact.

MODE FOR CARRYING OUT THE INVENTION

Hereinbelow, a plurality of embodiments of this invention will be described with reference to the drawings.

In the following description, a longitudinal direction of a conductive member is defined as a first direction X, a biasing direction of a biasing member is defined as a second direction Y, and a direction perpendicular to the first direction X and the second direction Y is defined as a third direction Z. In the following embodiments, a description will be given assuming that the second direction Y is perpendicular to the first direction X. However, it may be configured such that the second direction Y is not perpendicular to the first direction X.

Embodiment 1

Figure 1:
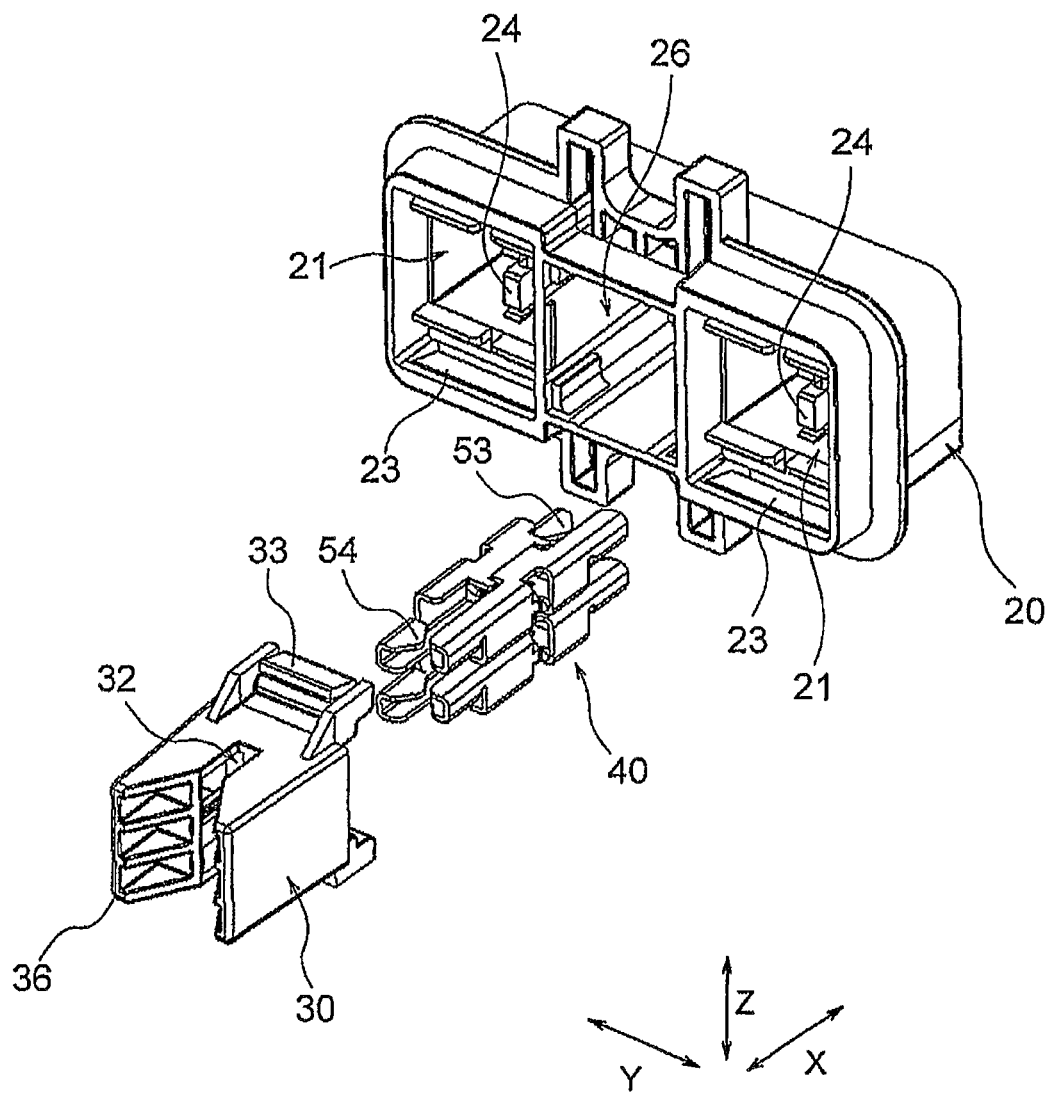
FIG. 1 is a perspective view showing contacts of a first embodiment along with a first housing and a second housing.
Figure 2:
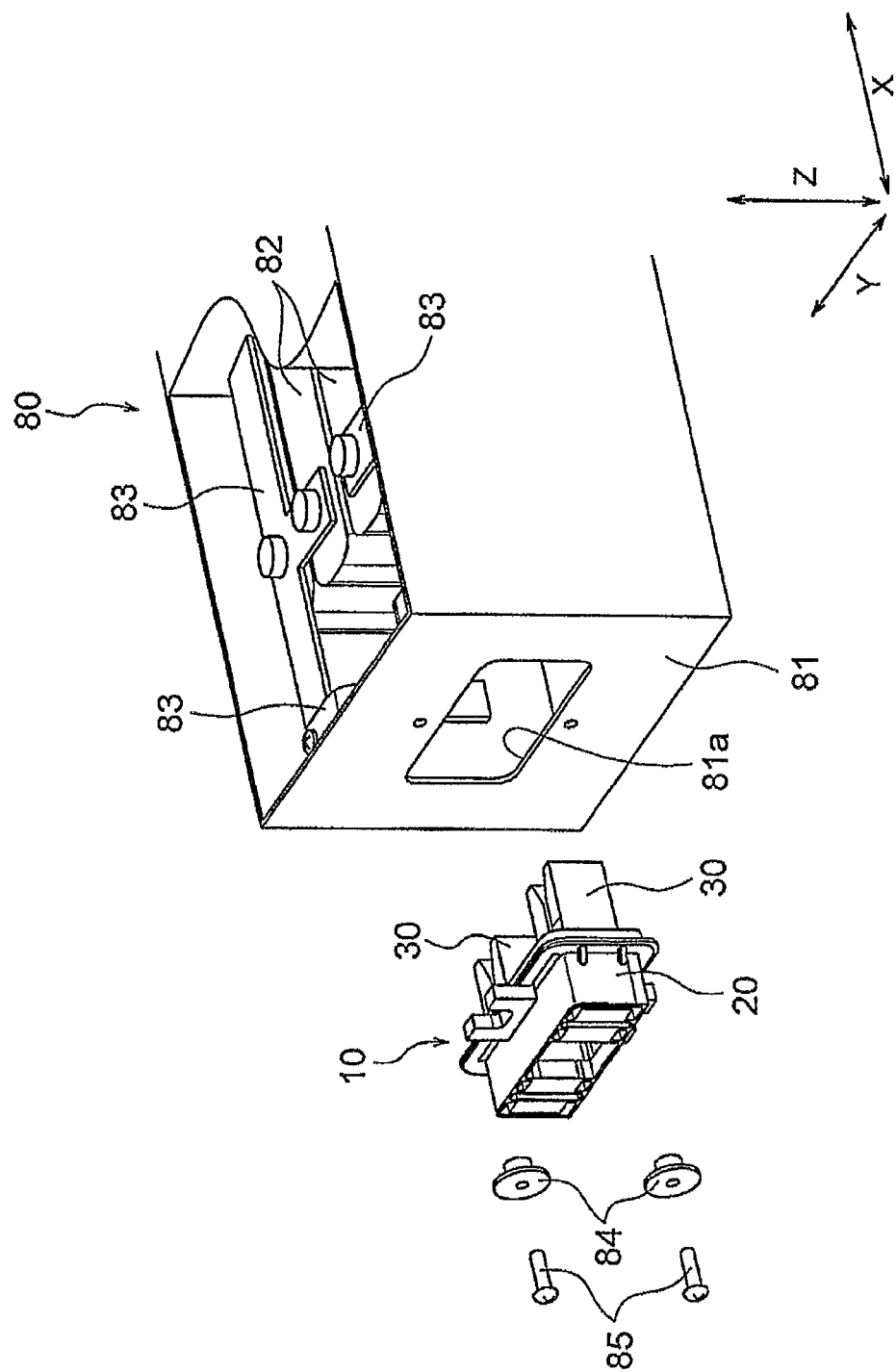
FIG. 2 is a diagram showing the manner of using a connector.
Figure 3:
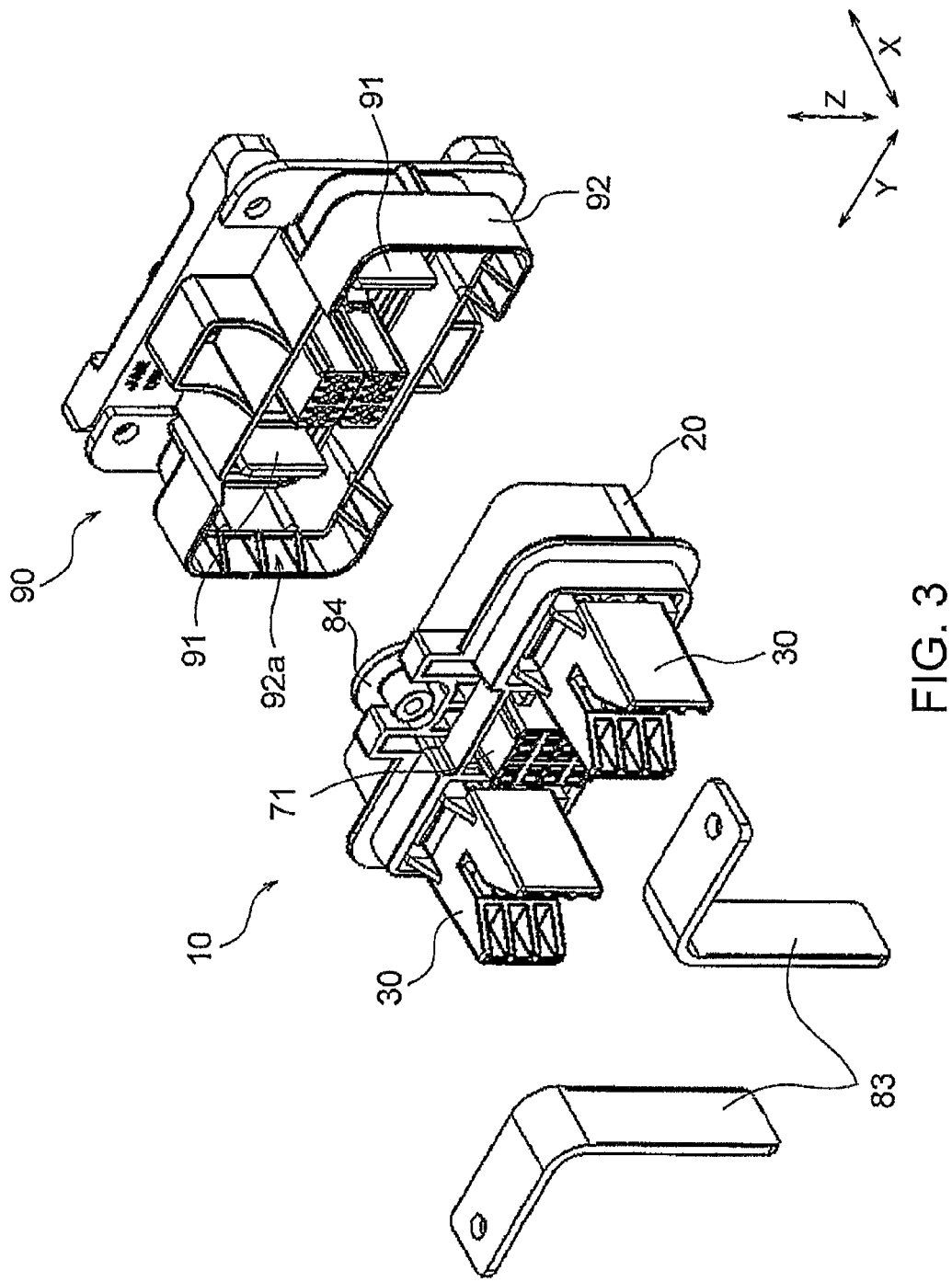
FIG. 3 is a perspective view showing the connector along with connection objects.

A connector 10 is a connector for a secondary battery. As shown in FIGS. 1 to 3, the connector 10 is attached to a casing 81 of a battery unit 80 incorporating batteries (secondary batteries) 82 and, when the battery unit 80 is inserted into a receiving rack (not illustrated), the connector 10 is fitted to a rack-side connector 90 attached to the receiving rack (not illustrated), thereby establishing electrical connection between bus bars 83 incorporated in the battery unit 80 and connected to the batteries 82 and rack-side contacts 91 provided in the rack-side connector 90.

As shown in FIGS. 1 to 4, the connector 10 comprises a first housing 20, second housings 30 each attached to the first housing 20 so as to be slidable in the second direction Y relative to the first housing 20, contacts 40 for power supply received in contact receiving portions 70 each formed by the first housing 20 and the second housing 30, and a signal housing 71 attached to the first housing 20 and holding signal contacts (not illustrated).

The first housing 20 is formed of an insulating resin. The first housing 20 is attached to the casing 81 of the battery unit 80 using spacers 84 and bolts 85 in the state where the first housing 20 has play (clearance) in the second direction Y and the third direction Z with respect to an attaching opening 81a formed in the casing 81 so as to be movable in the second direction Y and the third direction Z relative to the casing 81.

As shown in FIGS. 1 to 4, the first housing 20 integrally has first receiving portions 21 each receiving part of the contacts 40, first openings 22 each for allowing insertion of the rack-side contact 91 into the first receiving portion 21, slide guide portions 23 supporting later-described attaching spring portions 33 of each second housing 30 in the state where the attaching spring portions 33 are slidable in the second direction Y, first control portions 24 each controlling the position and posture of the contacts 40 in the contact receiving portion 70, first position restricting portions (not illustrated) each restricting the position of the contacts 40 in the third direction Z, and a signal housing holding portion 26 holding the signal housing 71.

Figure 4:
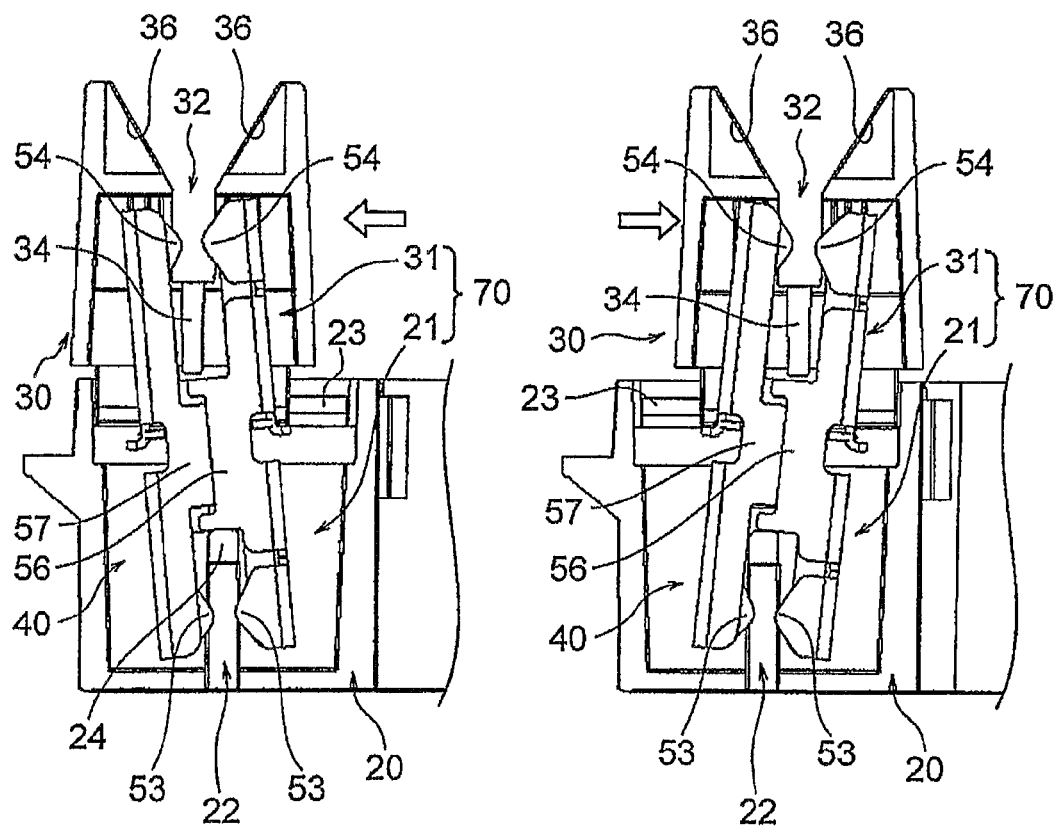
FIG. 4 is an explanatory diagram for explaining a state of the contact when sliding the second housing relative to the first housing.

As shown in FIGS. 1 and 4, the first receiving portion 21 is open on the second housing 30 side and forms the contact receiving portion 70 jointly with a second receiving portion 31 formed in the second housing 30.

As shown in FIGS. 1 to 4, the first control portion 24 extends in the third direction Z from inner walls, defining the first receiving portion 21, of the first housing 20 toward the inside of the first receiving portion 21 and is interposed between a pair of conductive members 50 of each contact 40 in a region between support portions 56 and 57 and first contact portions 53 of each contact 40 in the first direction X. Jointly with a second control portion 34 formed in the second housing 30, the first control portion 24 controls the posture (specifically, the posture in the plane defined by the first direction X and the second direction Y) of the contacts 40 in the contact receiving portion 70. More specifically, the first control portion 24 controls the positional relationship between the first opening 22 formed in the first housing 20 and the first contact portions 53 so that the rack-side contact 91 inserted from the first opening 22 can enter between the first contact portions 53 regardless of the positional relationship between the first housing 20 and the second housing 30. Further, the first control portion 24 serves as a portion that restricts the insertion position (depth of insertion) of the rack-side contact 91 in the first direction X when the rack-side contact 91 is inserted between the first contact portions 53.

The second housing 30 is formed of an insulating resin and attached to the first housing 20 so as to be slidable in the second direction Y relative to the first housing 20.

As shown in FIGS. 1 and 4, the second housing 30 integrally has the second receiving portion 31 receiving part of the contacts 40, a second opening 32 for allowing insertion of the bus bar 83 into the second receiving portion 31, the attaching spring portions 33 attached to the slide guide portions 23 of the first housing 20, the second control portion 34 controlling the position and posture of the contacts 40 in the contact receiving portion 70, a second position restricting portion (not illustrated) restricting the position of the contacts 40 in the third direction Z, and guide portions 36 serving to guide the bus bar 83 toward the second opening 32.

As shown in FIG. 4, the second receiving portion 31 is open on the first housing 20 side and forms the contact receiving portion 70 jointly with the first receiving portion 21 formed in the first housing 20.

As shown in FIG. 4, the second control portion 34 extends in the third direction Z from inner walls, defining the second receiving portion 31, of the second housing 30 toward the inside of the second receiving portion 31 and is interposed between the pair of conductive members 50 of each contact 40 in a region between the support portions 56 and 57 and second contact portions 54 of each contact 40 in the first direction X. Jointly with the first control portion 24 formed in the first housing 20, the second control portion 34 controls the posture (specifically, the posture in the plane defined by the first direction X and the second direction Y) of the contacts 40 in the contact receiving portion 70. More specifically, the second control portion 34 controls the positional relationship between the second opening 32 formed in the second housing 30 and the second contact portions 54 so that the bus bar 83 inserted from the second opening 32 can enter between the second contact portions 54 regardless of the positional relationship between the first housing 20 and the second housing 30. Further, the second control portion 34 serves as a portion that restricts the insertion position (depth of insertion) of the bus bar 83 in the first direction X when the bus bar 83 is inserted between the second contact portions 54.

The contact 40 is a socket contact for power supply. As shown in FIG. 1, the contacts 40 are arranged in a pair parallel to each other in the third direction Z in each of the contact receiving portions 70 formed in the connector 10. Each contact 40 is received with play (clearance) with respect to any members including the first housing 20 and the second housing 30. In other words, each contact 40 is not fixed to any members including the first housing 20 and the second housing 30.

Figure 5:
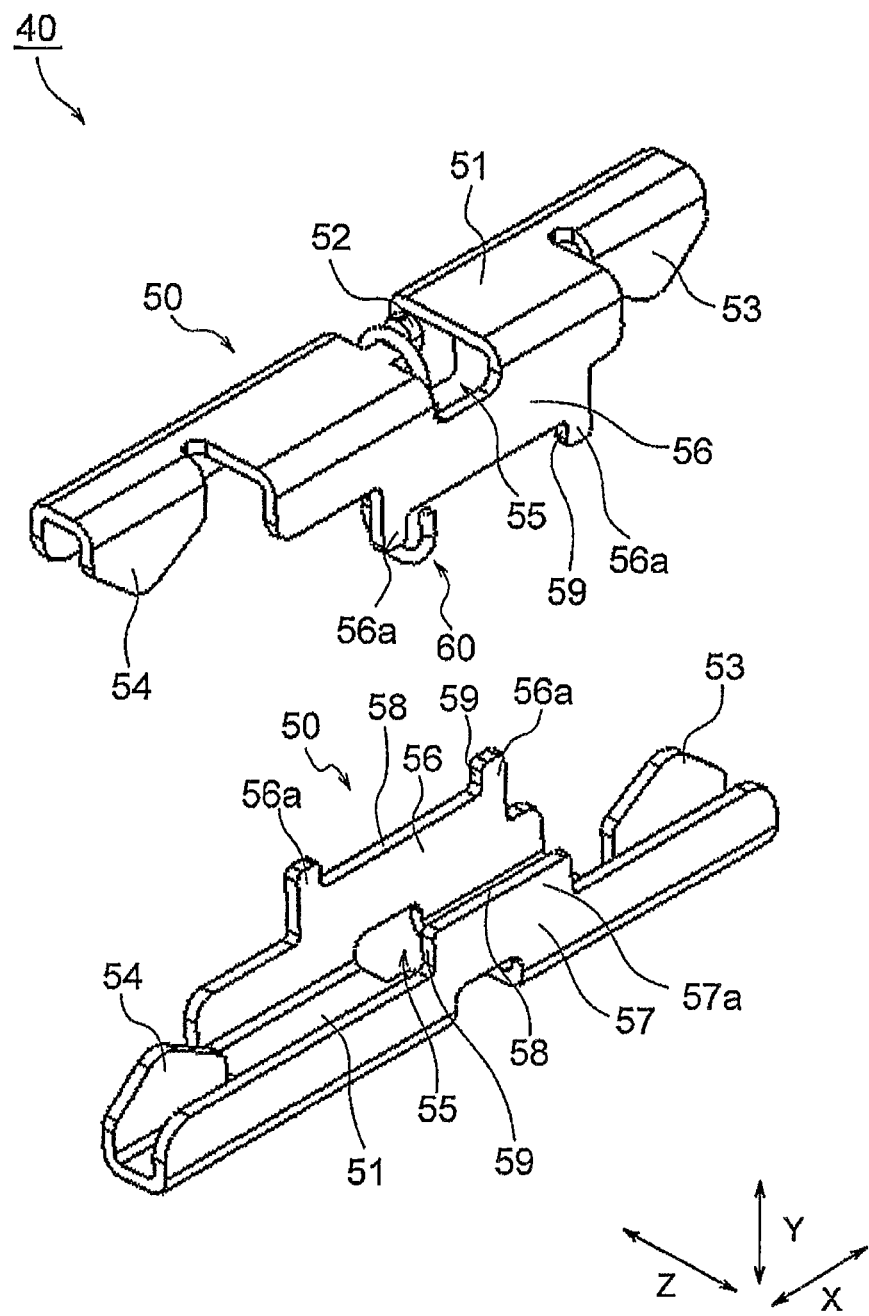
FIG. 5 is a perspective view showing a state of the contact before assembly thereof.
Figure 6:
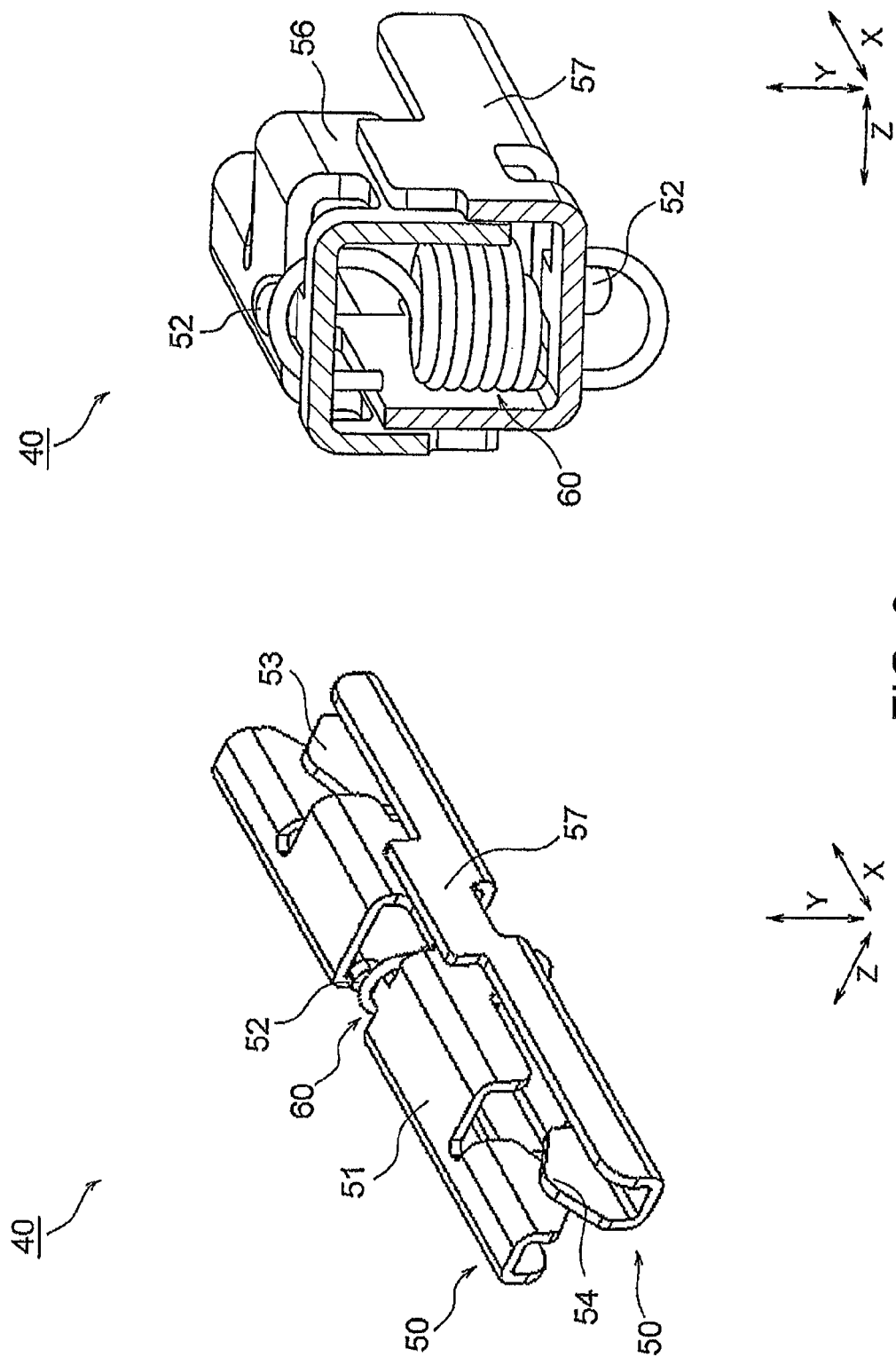
FIG. 6 is a perspective view showing a state of the contact during assembly thereof and an explanatory diagram showing the contact by cutting it.

As shown in FIG. 5, each contact 40 comprises the pair of conductive members 50 and a biasing member 60 which is attached between the pair of conductive members 50 and biases the pair of conductive members 50 toward each other. In this embodiment, as shown in FIG. 6, the biasing member 60 is in the form of a coil spring. However, its specific configuration is not limited thereto and, for example, it may be formed by an elastic member such as a rubber.

The pair of conductive members 50 are formed of an inelastic conductive metal (tough pitch copper, copper with a purity of about 99%) and have the same shape. In this embodiment, each conductive member 50 has a conductivity of 50% or more assuming that the conductivity of pure copper is 100%. Each conductive member 50 is formed by punching a metal plate into a predetermined shape and then bending predetermined portions thereof and thus has a shape with no overlapping portion when developed on a plane.

As shown in FIG. 5, each conductive member 50 has a base portion 51 arranged facing and spaced apart from that of the other conductive member 50, an attaching portion 52 formed at the base portion 51 and attached with the biasing member 60, the first contact portion 53 and the second contact portion 54 respectively formed on both sides, in the first direction X, of the attaching portion 52, an attaching hole 55 formed across the base portion 51, the first support portion 56, and the second support portion 57, and the first support portion 56 and the second support portion 57 respectively extending from both ends, in the third direction Z, of the base portion 51 toward the other conductive member 50 to support the other conductive member 50 against a biasing force of the biasing member 60.

The dimension, in the first direction X, of the base portion 51 is set longer than that in the third direction Z.

The attaching portion 52 extends from the base portion 51 toward the attaching hole 55 side and is formed in a hook shape. The attaching portion 52 of one of the conductive members 50 and the attaching portion 52 of the other conductive member 50 face each other in the second direction Y.

The first contact portion 53 protrudes in the second direction Y from one end, in the first direction X, of the base portion 51 and, in the assembled state of the contact 40, the first contact portion 53 faces that of the other conductive member 50 in the second direction Y. The first contact portion 53 is disposed in the first receiving portion 21 and is, jointly with the first contact portion 53 of the other conductive member 50, connected to the rack-side contact 91 by holding the rack-side contact 91 therebetween.

The second contact portion 54 protrudes in the second direction Y from the other end, in the first direction X, of the base portion 51 and, in the assembled state of the contact 40, the second contact portion 54 faces that of the other conductive member 50 in the second direction Y. The second contact portion 54 is disposed in the second receiving portion 31 and is, jointly with the second contact portion 54 of the other conductive member 50, connected to the bus bar 83 by holding the bus bar 83 therebetween.

The attaching hole 55 serves as an attaching space when attaching the biasing member 60 to the attaching portion 52.

The first support portion 56 extends in the second direction Y from one end, in the third direction Z, of the base portion 51. The first support portion 56 has first protruding portions 56a at its both ends in the first direction X. The first protruding portions 56a protrude in the second direction Y from a side surface, facing the other conductive member 50, of the first support portion 56.

The second support portion 57 extends in the second direction Y from the other end, in the third direction Z, of the base portion 51. The second support portion 57 has a second protruding portion 57a protruding in the second direction Y from a side surface, facing the other conductive member 50, of the second support portion 57. In the assembled state of the contact 40, the second protruding portion 57a is disposed with play in the first direction X between the pair of first protruding portions 56a of the other conductive member 50.

The movement of the contact 40 becomes smooth to provide better contact if the first contact portion 53, the attaching portion 52, and the second contact portion 54 are substantially aligned with each other in the first direction X.

Figure 7:
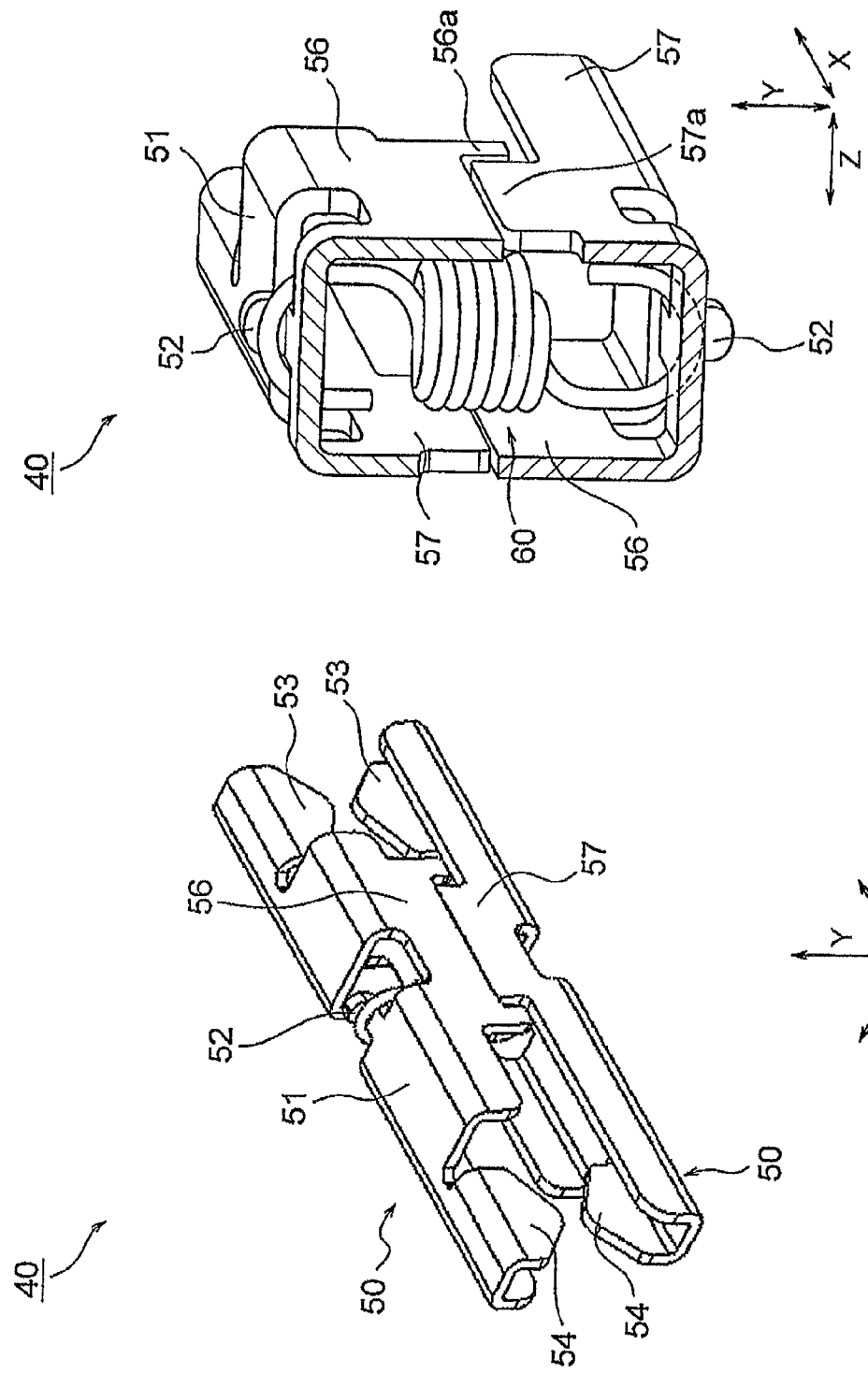
FIG. 7 is a perspective view showing a state of the contact after assembly thereof and an explanatory diagram showing the contact by cutting it.

As shown in FIG. 7, each contact 40 is configured such that, in the state where the biasing member 60 is attached to the pair of conductive members 50 and the first and second support portions 56 and 57 of the pair of conductive members 50 are engaged with each other, the three-dimensional structure after the assembly is autonomously maintained.

Specifically, in this embodiment, in the assembled state of the contact 40, side surfaces, facing the other conductive members 50, of the second protruding portions 57a and side surfaces, facing the other conductive members 50, of the first support portions 56 respectively serve as abutting portions 58 that abut against each other in the second direction Y.

Figure 8A:
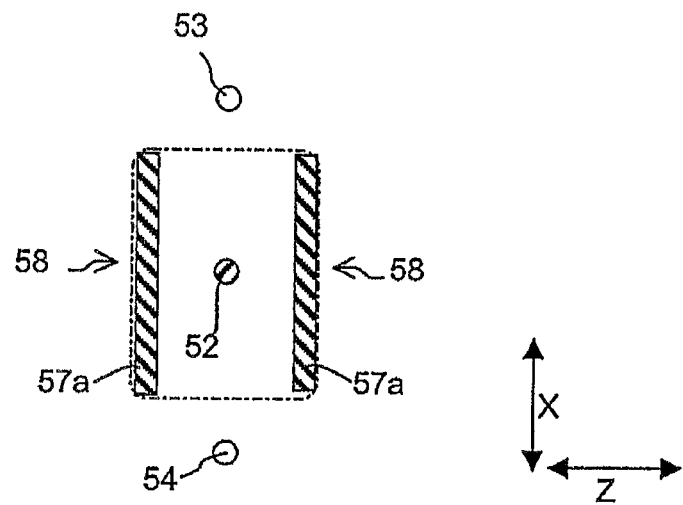
FIG. 8A is an explanatory diagram exemplarily showing the positional relationship between abutting portions, contact portions, and attaching portions as seen in a biasing direction in the state where no connection object is inserted into the contact.
Figure 8B:
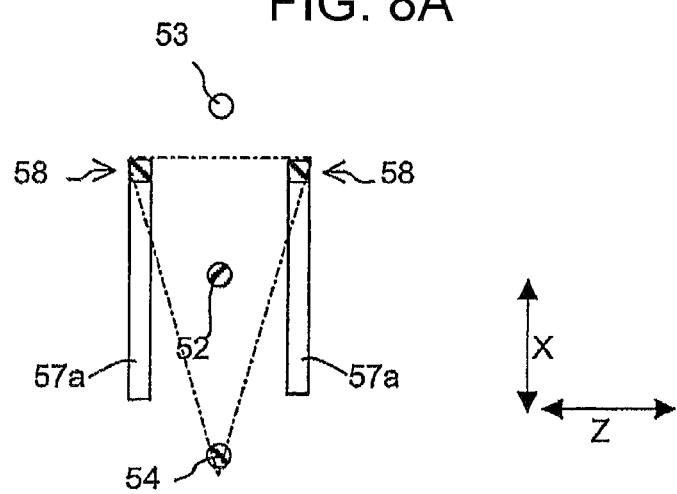
FIG. 8B is an explanatory diagram exemplarily showing the positional relationship between the abutting portions, the contact portions, and the attaching portions as seen in the biasing direction in the state where a connection object is inserted between the second contact portions.
Figure 8C:
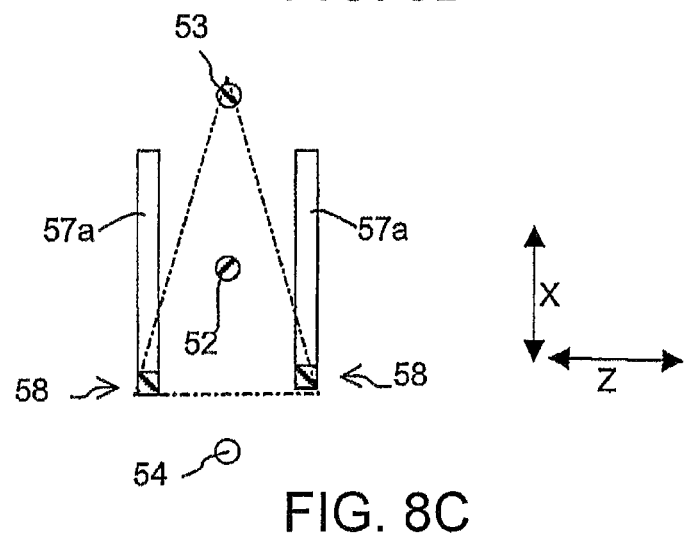
FIG. 8C is an explanatory diagram exemplarily showing the positional relationship between the abutting portions, the contact portions, and the attaching portions as seen in the biasing direction in the state where a connection object is inserted between the first contact portions.

Herein, the state of the contact 40 having been assembled will be described in detail with reference to FIGS. 8A to 8C in three cases, i.e. when no connection object is inserted into the contact 40, when a connection object is inserted only between the second contact portions 54, and when a connection object is inserted only between the first contact portions 53. While the case where the connection object is inserted only between the first contact portions 53 is not realized in this embodiment, it will virtually be described. FIGS. 8A to 8C exemplarily show the positional relationships between the abutting portions 58, the first and second contact portions 53 and 54, and the attaching portions 52 as seen in the biasing direction of the biasing member 60 (second direction Y).

First, in the state where the contact 40 has been assembled and no connection object (bus bar 83, rack-side contact 91) is inserted into the contact 40, the entire side surfaces, facing the other conductive members 50, of the second protruding portions 57a abut against the first support portions 56 and serve as the abutting portions 58. In this state, as shown in FIG. 8A, the attaching portions 52 are located within a region defined by connecting the outermost points, with respect to the attaching portion 52, of the abutting portions 58 and therefore the relative posture between the pair of conductive members 50 can be maintained against the biasing force of the biasing member 60.

On the other hand, in the state where the contact 40 has been assembled and the connection object (bus bar 83) is inserted only between the second contact portions 54, the distance between the second contact portions 54 increases due to the insertion of the connection object so that end portions, on the first contact portion 53 side, of the second protruding portions 57a abut against the first support portions 56 and serve as the abutting portions 58. Also in this state, as shown in FIG. 8B, the attaching portions 52 are located within a region defined by connecting the outermost points, with respect to the attaching portion 52, of the abutting portions 58 and the second contact portion 54 and therefore the relative posture between the pair of conductive members 50 can be maintained against the biasing force of the biasing member 60.

On the other hand, in the state where the contact 40 has been assembled and the connection object (rack-side contact 91) is inserted only between the first contact portions 53, the distance between the first contact portions 53 increases due to the insertion of the connection object so that end portions, on the second contact portion 54 side, of the second protruding portions 57a abut against the first support portions 56 and serve as the abutting portions 58. Also in this state, as shown in FIG. 8C, the attaching portions 52 are located within a region defined by connecting the outermost points, with respect to the attaching portion 52, of the abutting portions 58 and the first contact portion 53 and therefore the relative posture between the pair of conductive members 50 can be maintained against the biasing force of the biasing member 60.

In this manner, the contact 40 of this embodiment is configured such that, in any of the cases where no connection object is inserted into the contact 40, where the connection object is inserted only between the second contact portions 54, and where the connection object is inserted only between the first contact portions 53, the relative posture between the pair of conductive members 50 can be maintained against the biasing force of the biasing member 60 while preventing an excessive load from being applied to portions forming later-described movement restricting portions 59 or the like and preventing smooth movement of the contact 40 from being impaired.

Inner surfaces, in the first direction X, of the first protruding portions 56a and outer surfaces, in the first direction X, of the second protruding portions 57a respectively serve as the movement restricting portions 59 that abut against (face) each other in the first direction X to thereby restrict the relative movement between the pair of conductive members 50 in the first direction X.

Herein, the dimension, in the second direction Y, of each first protruding portion 56a is set so that the first protruding portions 56a abut against (face) the outer surfaces of the second protruding portions 57a in any of the cases where no connection object is inserted into the contact 40, where the connection object is inserted only between the second contact portions 54, where the connection object is inserted only between the first contact portions 53, and where the connection objects are inserted between the second contact portions 54 and between the first contact portions 53.

As described before, the position and posture (specifically, the position and posture in the plane defined by the first direction X and the second direction Y) of the contacts 40 in the contact receiving portion 70 are controlled by the first control portion 24 formed in the first housing 20 and the second control portion 34 formed in the second housing 30 while the position of the contacts 40 in the third direction Z in the contact receiving portion 70 is restricted by the first position restricting portion (not illustrated) formed in the first housing 20 and the second position restricting portion (not illustrated) formed in the second housing 30.

As shown in FIGS. 6 and 7, the biasing member 60 is attached between the attaching portions 52 respectively formed in the pair of conductive members 50 and is disposed in a space defined by the base portions 51 and the first and second support portions 56 and 57 respectively formed in the pair of conductive members 50 forming the contact 40.

Next, referring to FIGS. 6 and 7, an assembly method of the contact 40 will be described hereinbelow.

First, as shown in FIG. 6, the conductive members 50 are disposed so as to be offset from each other in the third direction Z and then are moved so that the attaching portions 52 formed in the conductive members 50 approach each other to positions where both ends of the biasing member 60 can be engaged with the attaching portions 52.

Then, as shown in FIG. 6, both ends of the biasing member 60 are engaged with the attaching portions 52 formed in the conductive members 50.

Then, as shown in FIG. 7, the relative posture between the pair of conductive members 50 is adjusted to extend the biasing member 60 and then the first support portion 56 of each of the conductive members 50 and the second support portion 57 of the other conductive member 50 are engaged with each other, thereby completing assembly of the contact 40.

Next, referring mainly to FIG. 1, an assembly method of the connector 10 will be described.

First, the contacts 40 are inserted into each of the first receiving portions 21 of the first housing 20.

Herein, the distance between the first contact portions 53 facing each other in the second direction Y is set shorter than the width (width in the second direction Y) of the first control portion 24 formed in the first housing 20. Consequently, when each contact 40 is inserted into the first housing 20, the distance between the first contact portions 53 is once increased by the first control portion 24. Then, when the contact 40 is further inserted, the first contact portions 53 ride over the first control portion 24 so that the distance between the first contact portions 53 returns to the initial distance.

Accordingly, the contact 40 is prevented from coming off in the first direction X by the first control portion 24.

In this manner, the attachment of the contact 40 to the first housing 20 is achieved by the single operation of inserting the contact 40 into the first receiving portion 21.

Then, the second housings 30 are each inserted into the first housing 20 with the attaching spring portion 33 side at the head.

In this event, the attaching spring portions 33 are brought into contact with the first housing 20 so as to be once elastically deformed. Then, when the attaching spring portions 33 are further inserted into the first housing 20, the attaching spring portions 33 are elastically restored to engage with the slide guide portions 23 of the first housing 20 so that the second housing 30 is prevented from coming off the first housing 20.

Herein, the distance between the second contact portions 54 facing each other in the second direction Y is set equal to or greater than the width (width in the second direction Y) of the second control portion 34. Consequently, when the second housing 30 is inserted into the first housing 20, the second contact portions 54 and the second control portion 34 do not interfere with each other so that the second housing 30 can be smoothly inserted into the first housing 20.

In this manner, the attachment of the second housing 30 to the first housing 20 is achieved by the single operation of inserting the second housing 30 into the first housing 20.

Like the first control portion 24, the width of the second control portion 34 may be set greater than the distance between the second contact portions 54.

In this embodiment thus obtained, since the conductive member 50 is integrally formed with the support portions 56 and 57 that support the other conductive member 50 against the biasing force of the biasing member 60, it is possible to maintain the three-dimensional shape of the contact 40 after assembly thereof without requiring an additional member and therefore it is possible to reduce the number of components.

Further, the assembly of the contact 40 is achieved only by the operation of adjusting the relative posture of the pair of conductive members 50 after attaching the biasing member 60 to the attaching portions 52 formed in the pair of conductive members 50 so that the support portions 56 and 57 formed in one of the conductive members 50 abut against the predetermined portions of the other conductive member 50. Therefore, it is possible to reduce the workload for the assembly of the contact 40.

Further, since a support structure in which support shafts are inserted through holes formed in the conductive members 50, as required in the prior art, is not required, it is possible to reduce the dimension of the conductive members 50 in the second direction Y and thus to achieve miniaturization of the contact 40.

Further, since the conductive members 50 have the movement restricting portions 59 that abut against each other in the first direction X, it is possible to restrict the relative movement between the pair of conductive members 50 in the first direction X.

Embodiment 2

Next, a second embodiment of this invention will be described with reference to FIGS. 9 to 12C. Since the second embodiment is entirely the same in structure as the first embodiment except for a contact, only the contact as the different point will be described.

First, each of contacts 140 in the second embodiment is a socket contact for power supply. The contacts 140 are arranged in a pair parallel to each other in the third direction Z in each of contact receiving portions 70 formed in a connector 10. Each contact 140 is received with play (clearance) with respect to any members including a first housing 20 and a second housing 30. In other words, each contact 140 is not fixed to any members including the first housing 20 and the second housing 30.

Figure 9:
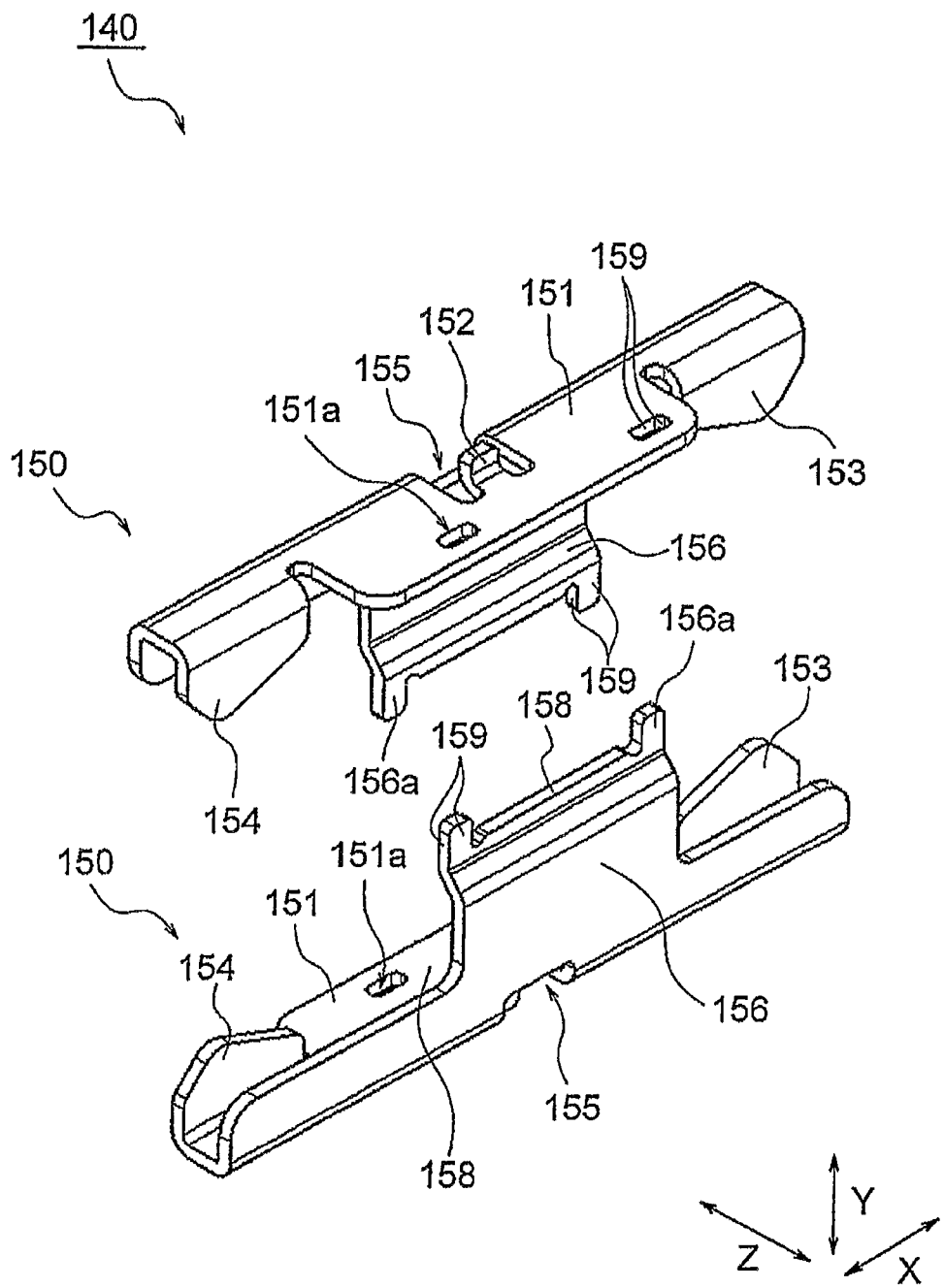
FIG. 9 is a perspective view showing a state of a contact of a second embodiment before assembly thereof.
Figure 10:
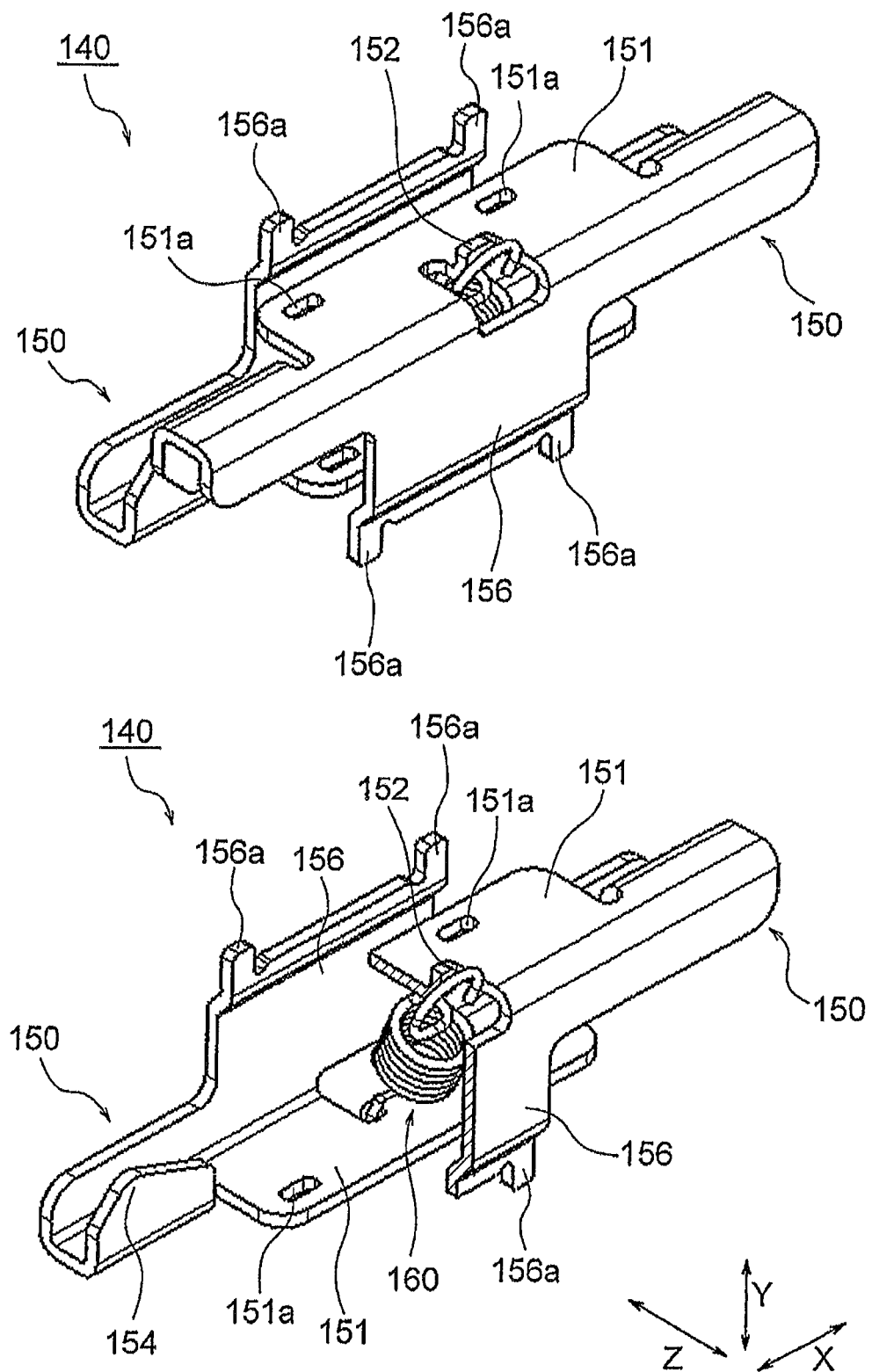
FIG. 10 is a perspective view showing a state of the contact of the second embodiment during assembly thereof and an explanatory diagram showing the contact by cutting it.
Figure 11:
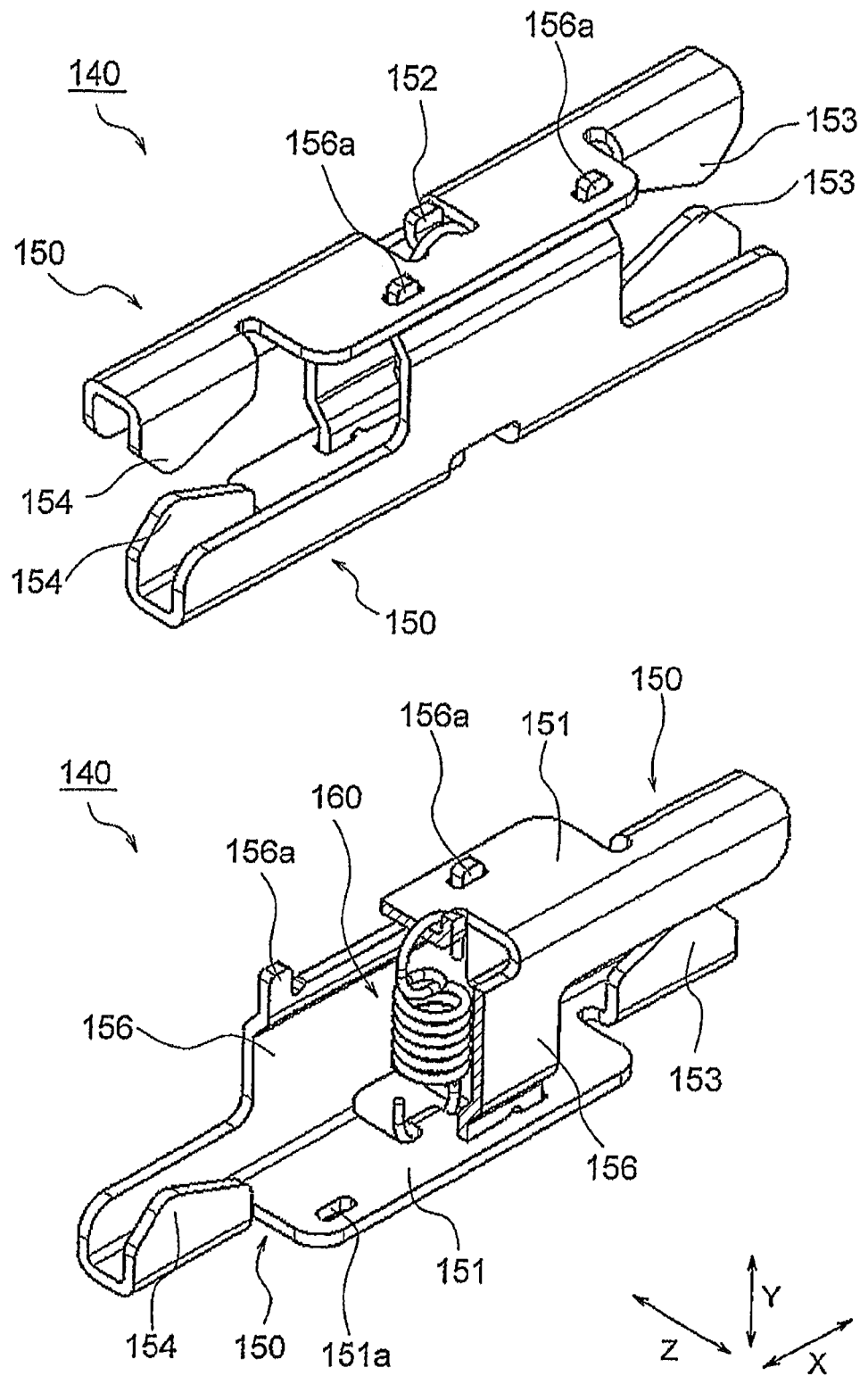
FIG. 11 is a perspective view showing a state of the contact of the second embodiment after assembly thereof and an explanatory diagram showing the contact by cutting it.

As shown in FIG. 9, each contact 140 comprises a pair of conductive members 150 and a biasing member 160 which is attached between the pair of conductive members 150 and biases the pair of conductive members 150 toward each other. In this embodiment, as shown in FIGS. 10 and 11, the biasing member 160 is in the form of a coil spring. However, its specific configuration is not limited thereto and, for example, it may be formed by an elastic member such as a rubber.

The pair of conductive members 150 are formed of an inelastic conductive metal (tough pitch copper, copper with a purity of about 99%) and have the same shape. In this embodiment, each conductive member 150 has a conductivity of 50% or more assuming that the conductivity of pure copper is 100%. Each conductive member 150 is formed by punching a metal plate into a predetermined shape and then bending predetermined portions thereof and thus has a shape with no overlapping portion when developed on a plane.

As shown in FIG. 9, each conductive member 150 has a base portion 151 arranged facing and spaced apart from that of the other conductive member 150, an attaching portion 152 formed at the base portion 151 and attached with the biasing member 160, a first contact portion 153 and a second contact portion 154 respectively formed on both sides, in the first direction X, of the attaching portion 152, an attaching hole 155 formed across the base portion 151 and a support portion 156, and the support portion 156 extending from one end, in the third direction Z, of the base portion 151 toward the other conductive member 150 to support the other conductive member 150 against a biasing force of the biasing member 160.

The dimension, in the first direction X, of the base portion 151 is set longer than that in the third direction Z. The base portion 151 has two holes 151a each formed therethrough along the second direction Y. In the assembled state of the contact 140, protruding portions 156a formed in the other conductive member 150 are inserted through these holes 151a.

The attaching portion 152 extends from the base portion 151 toward the attaching hole 155 side and is formed in a hook shape. The attaching portion 152 of one of the conductive members 150 and the attaching portion 152 of the other conductive member 150 face each other in the second direction Y.

The first contact portion 153 protrudes in the second direction Y from one end, in the first direction X, of the base portion 151 and, in the assembled state of the contact 140, the first contact portion 153 faces that of the other conductive member 150 in the second direction Y. The first contact portion 153 is disposed in a first receiving portion 21 and is, jointly with the first contact portion 153 of the other conductive member 150, connected to a rack-side contact 91 by holding the rack-side contact 91 therebetween.

The second contact portion 154 protrudes in the second direction Y from the other end, in the first direction X, of the base portion 151 and, in the assembled state of the contact 140, the second contact portion 154 faces that of the other conductive member 150 in the second direction Y. The second contact portion 154 is disposed in a second receiving portion 31 and is, jointly with the second contact portion 154 of the other conductive member 150, connected to a bus bar 83 by holding the bus bar 83 therebetween.

The attaching hole 155 serves as an attaching space when attaching the biasing member 160 to the attaching portion 152.

The support portion 156 extends in the second direction Y from one end, in the third direction Z, of the base portion 151. The support portion 156 has the protruding portions 156a at its both ends in the first direction X. The protruding portions 156a protrude in the second direction Y from a side surface, facing the other conductive member 150, of the support portion 156. In the assembled state of the contact 140, the protruding portions 156a are respectively inserted along the second direction Y through the holes 151a formed in the base portion 151 of the other conductive member 150 in the state where each protruding portion 156a has play in the first direction X and the third direction Z in the hole 151a.

The movement of the contact 140 becomes smooth to provide better contact if the first contact portion 153, the attaching portion 152, and the second contact portion 154 are substantially aligned with each other in the first direction X.

As shown in FIG. 11, each contact 140 is configured such that, in the state where the biasing member 160 is attached to the pair of conductive members 150 and the protruding portions 156a formed at the support portions 156 are engaged into the holes 151a formed in the base portions 151, the three-dimensional structure after the assembly is autonomously maintained.

Specifically, in this embodiment, in the assembled state of the contact 140, side surfaces (precisely, inner portions each between the pair of protruding portions 156a), facing the other conductive members 150, of the support portions 156 and side surfaces, facing the other conductive members 150, of the base portions 151 respectively serve as abutting portions 158 that abut against each other in the second direction Y.

Herein, the state of the contact 140 having been assembled will be described in detail with reference to FIGS. 12A to 12C in three cases, i.e. when no connection object is inserted into the contact 140, when a connection object is inserted only between the second contact portions 154, and when a connection object is inserted only between the first contact portions 153.

While the case where the connection object is inserted only between the first contact portions 153 is not realized in this embodiment, it will virtually be described.

Figure 12A:
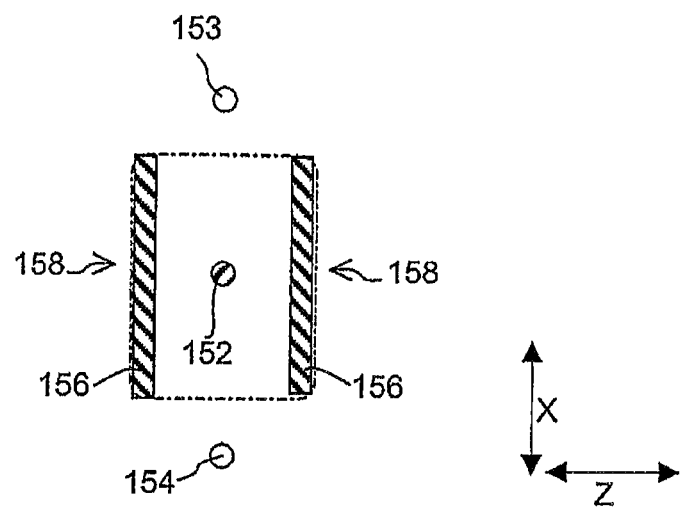
FIG. 12A is an explanatory diagram exemplarily showing the positional relationship between abutting portions, contact portions, and attaching portions as seen in a biasing direction in the state where no connection object is inserted into the contact.
Figure 12B:
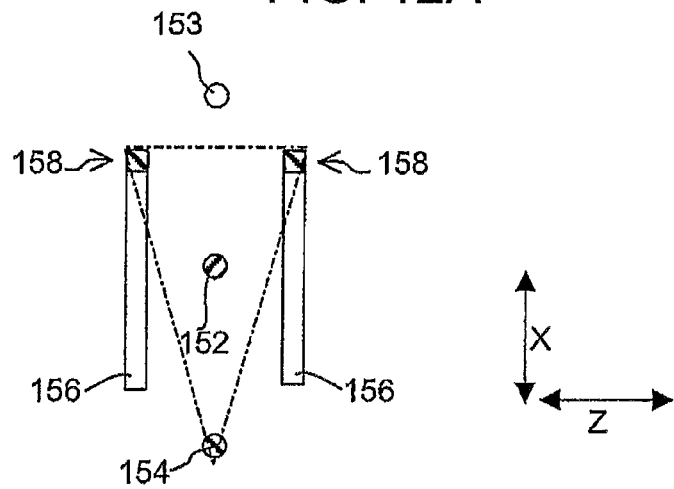
FIG. 12B is an explanatory diagram exemplarily showing the positional relationship between the abutting portions, the contact portions, and the attaching portions as seen in the biasing direction in the state where a connection object is inserted between the second contact portions.
Figure 12C:
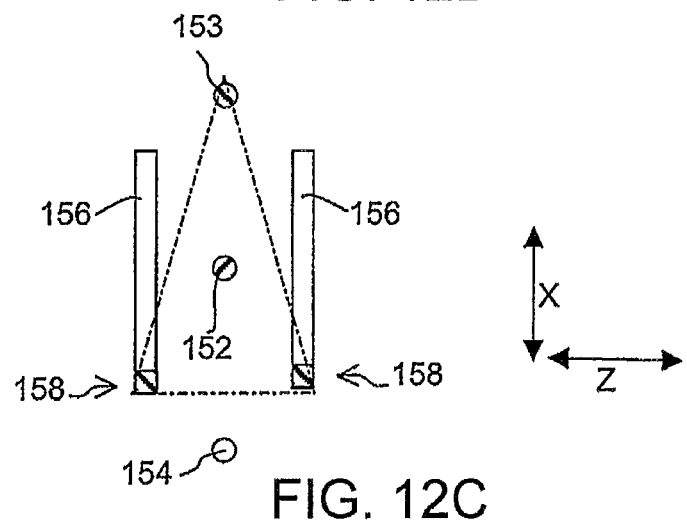
FIG. 12C is an explanatory diagram exemplarily showing the positional relationship between the abutting portions, the contact portions, and the attaching portions as seen in the biasing direction in the state where a connection object is inserted between the first contact portions.

FIGS. 12A to 12C exemplarily show the positional relationships between the abutting portions 158, the first and second contact portions 153 and 154, and the attaching portions 152 as seen in the biasing direction of the biasing member 160 (second direction Y).

First, in the state where the contact 140 has been assembled and no connection object (bus bar 83, rack-side contact 91) is inserted into the contact 140, the side surfaces, facing the other conductive members 150, of the support portions 156 abut against the base portions 151 and serve as the abutting portions 158. In this state, as shown in FIG. 12A, the attaching portions 152 are located within a region defined by connecting the outermost points, with respect to the attaching portion 152, of the abutting portions 158 and therefore the relative posture between the pair of conductive members 150 can be maintained against the biasing force of the biasing member 160.

On the other hand, in the state where the contact 140 has been assembled and the connection object (bus bar 83) is inserted only between the second contact portions 154, the distance between the second contact portions 154 increases due to the insertion of the connection object so that end portions, on the first contact portion 153 side, of the support portions 156 abut against the base portions 151 and serve as the abutting portions 158. Also in this state, as shown in FIG. 12B, the attaching portions 152 are located within a region defined by connecting the outermost points, with respect to the attaching portion 152, of the abutting portions 158 and the second contact portion 154 and therefore the relative posture between the pair of conductive members 150 can be maintained against the biasing force of the biasing member 160.

On the other hand, in the state where the contact 140 has been assembled and the connection object (rack-side contact 91) is inserted only between the first contact portions 153, the distance between the first contact portions 153 increases due to the insertion of the connection object so that end portions, on the second contact portion 154 side, of the support portions 156 abut against the base portions 151 and serve as the abutting portions 158. Also in this state, as shown in FIG. 12C, the attaching portions 152 are located within a region defined by connecting the outermost points, with respect to the attaching portion 152, of the abutting portions 158 and the first contact portion 153 and therefore the relative posture between the pair of conductive members 150 can be maintained against the biasing force of the biasing member 160.

In this manner, the contact 140 of this embodiment is configured such that, in any of the cases where no connection object is inserted into the contact 140, where the connection object is inserted only between the second contact portions 154, and where the connection object is inserted only between the first contact portions 153, the relative posture between the pair of conductive members 150 can be maintained against the biasing force of the biasing member 160 while preventing an excessive load from being applied to portions forming later-described movement restricting portions 159 or the like and preventing smooth movement of the contact 140 from being impaired.

Inner surfaces of the holes 151a formed in the base portions 151 and outer surfaces of the protruding portions 156a formed at the support portions 156 respectively serve as the movement restricting portions 159 that abut against (face) each other in the first direction X and the third direction Z to thereby restrict the relative movement between the pair of conductive members 150 in the first direction X and the third direction Z.

Herein, the dimension, in the second direction Y, of each protruding portion 156a is set so that the protruding portions 156a are located in the holes 151a and abut against (face) the inner surfaces of the holes 151a in the first direction X and the third direction Z in any of the cases where no connection object is inserted into the contact 140, where the connection object is inserted only between the second contact portions 154, where the connection object is inserted only between the first contact portions 153, and where the connection objects are inserted between the second contact portions 154 and between the first contact portions 153.

As described before, the position and posture (specifically, the position and posture in the plane defined by the first direction X and the second direction Y) of the contacts 140 in the contact receiving portion 70 are controlled by a first control portion 24 formed in the first housing 20 and a second control portion 34 formed in the second housing 30 while the position of the contacts 140 in the third direction Z in the contact receiving portion 70 is restricted by a first position restricting portion (not illustrated) formed in the first housing 20 and a second position restricting portion (not illustrated) formed in the second housing 30.

As shown in FIG. 11, the biasing member 160 is attached between the attaching portions 152 respectively formed in the pair of conductive members 150 and is disposed in a space defined by the base portions 151 and the support portions 156 respectively formed in the pair of conductive members 150 forming the contact 140.

Next, referring to FIGS. 10 and 11, an assembly method of the contact 140 will be described hereinbelow.

First, as shown in FIG. 10, the conductive members 150 are disposed so as to be offset from each other in the third direction Z and then are moved so that the attaching portions 152 formed in the conductive members 150 approach each other to positions where both ends of the biasing member 160 can be engaged with the attaching portions 152.

Then, as shown in FIG. 10, both ends of the biasing member 160 are engaged with the attaching portions 152 formed in the conductive members 150.

Then, as shown in FIG. 11, the relative posture between the pair of conductive members 150 is adjusted to extend the biasing member 160 and then the holes 151a of each of the conductive members 150 and the protruding portions 156a of the other conductive member 150 are engaged with each other, thereby completing assembly of the contact 140.

In this embodiment thus obtained, apart from the above-mentioned effects in the first embodiment, since the conductive members 150 have the movement restricting portions 159 that abut against each other in the first direction X and the third direction Z, it is possible to restrict the relative movement between the pair of conductive members 150 also in the third direction Z in addition to the first direction X.

Embodiment 3

Next, a third embodiment of this invention will be described with reference to FIGS. 13 to 16C. Since the third embodiment is entirely the same in structure as the first embodiment except for a contact, only the contact as the different point will be described.

First, each of contacts 240 in this embodiment is a socket contact for power supply. The contacts 240 are arranged in a pair parallel to each other in the third direction Z in each of contact receiving portions 70 formed in a connector 10. Each contact 240 is received with play (clearance) with respect to any members including a first housing 20 and a second housing 30. In other words, each contact 240 is not fixed to any members including the first housing 20 and the second housing 30.

Figure 13:
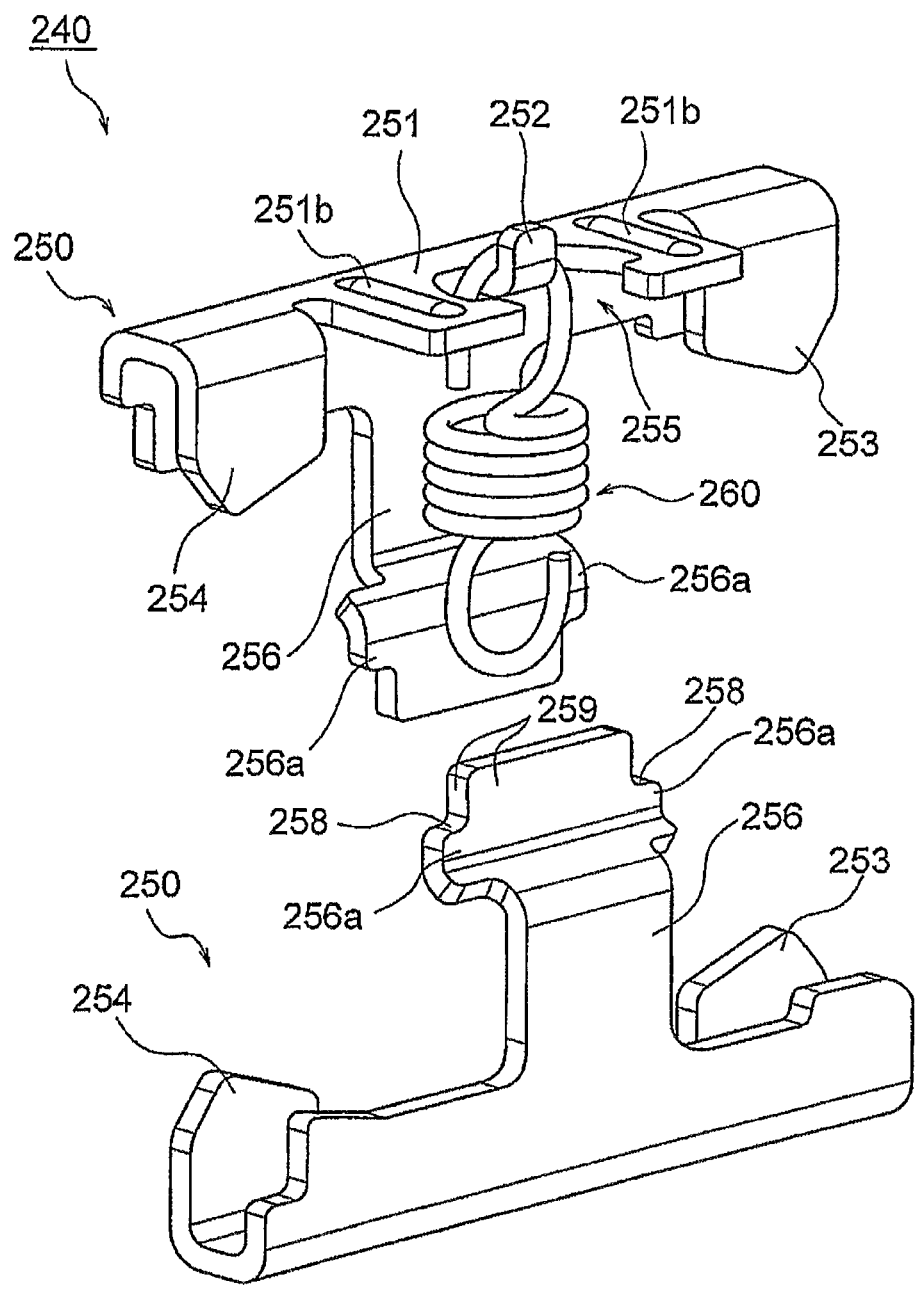
FIG. 13 is a perspective view showing a state of a contact of a third embodiment before assembly thereof.
Figure 13:
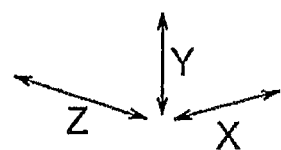

As shown in FIG. 13, each contact 240 comprises a pair of conductive members 250 and a biasing member 260 which is attached between the pair of conductive members 250 and biases the pair of conductive members 250 toward each other. In this embodiment, as shown in FIG. 13, the biasing member 260 is in the form of a coil spring. However, its specific configuration is not limited thereto and, for example, it may be formed by an elastic member such as a rubber.

The pair of conductive members 250 are formed of an inelastic conductive metal (tough pitch copper, copper with a purity of about 99%) and have the same shape. In this embodiment, each conductive member 250 has a conductivity of 50% or more assuming that the conductivity of pure copper is 100%. Each conductive member 250 is formed by punching a metal plate into a predetermined shape and then bending predetermined portions thereof and thus has a shape with no overlapping portion when developed on a plane.

As shown in FIG. 13, each conductive member 250 has a base portion 251 arranged facing and spaced apart from that of the other conductive member 250, an attaching portion 252 formed at the base portion 251 and attached with the biasing member 260, a first contact portion 253 and a second contact portion 254 respectively formed on both sides, in the first direction X, of the attaching portion 252, an attaching hole 255 formed in the base portion 251, and a support portion 256 extending from one end, in the third direction Z, of the base portion 251 toward the other conductive member 250 to support the other conductive member 250 against a biasing force of the biasing member 260.

The dimension, in the first direction X, of the base portion 251 is set longer than that in the third direction Z. In this embodiment, the base portion 251 is formed with reinforcing portions 251b by coining.

The attaching portion 252 extends from the base portion 251 toward the attaching hole 255 side and is formed in a hook shape. The attaching portion 252 of one of the conductive members 250 and the attaching portion 252 of the other conductive member 250 face each other in the second direction Y.

The first contact portion 253 protrudes in the second direction Y from one end, in the first direction X, of the base portion 251 and, in the assembled state of the contact 240, the first contact portion 253 faces that of the other conductive member 250 in the second direction Y. The first contact portion 253 is disposed in a first receiving portion 21 and is, jointly with the first contact portion 253 of the other conductive member 250, connected to a rack-side contact 91 by holding the rack-side contact 91 therebetween.

The second contact portion 254 protrudes in the second direction Y from the other end, in the first direction X, of the base portion 251 and, in the assembled state of the contact 240, the second contact portion 254 faces that of the other conductive member 250 in the second direction Y. The second contact portion 254 is disposed in a second receiving portion 31 and is, jointly with the second contact portion 254 of the other conductive member 250, connected to a bus bar 83 by holding the bus bar 83 therebetween.

The attaching hole 255 is a hole that is formed through the base portion 251 along the second direction Y and serves as an attaching space when attaching the biasing member 260 to the attaching portion 252. In this embodiment, the attaching hole 255 is open in one direction along the third direction Z. This makes it possible to attach the biasing member 260 to the attaching portion 252 in the third direction Z and thus facilitates the attachment of the biasing member 260. The attaching hole 255 has an inner surface curved in the plane defined by the first direction X and the third direction Z.

The support portion 256 extends in the second direction Y from one end, in the third direction Z, of the base portion 251. The support portion 256 has protruding portions 256a, protruding outward in the first direction X, on its both side surfaces in the first direction X. In the assembled state of the contact 240, a free end of the support portion 256 is inserted along the second direction Y through the attaching hole 255 formed in the base portion 251 so as to be engaged therewith in the state where the free end of the support portion 256 has play in the first direction X and the third direction Z in the attaching hole 255.

The movement of the contact 240 becomes smooth to provide better contact if the first contact portion 253, the attaching portion 252, and the second contact portion 254 are substantially aligned with each other in the first direction X.

Figure 14:
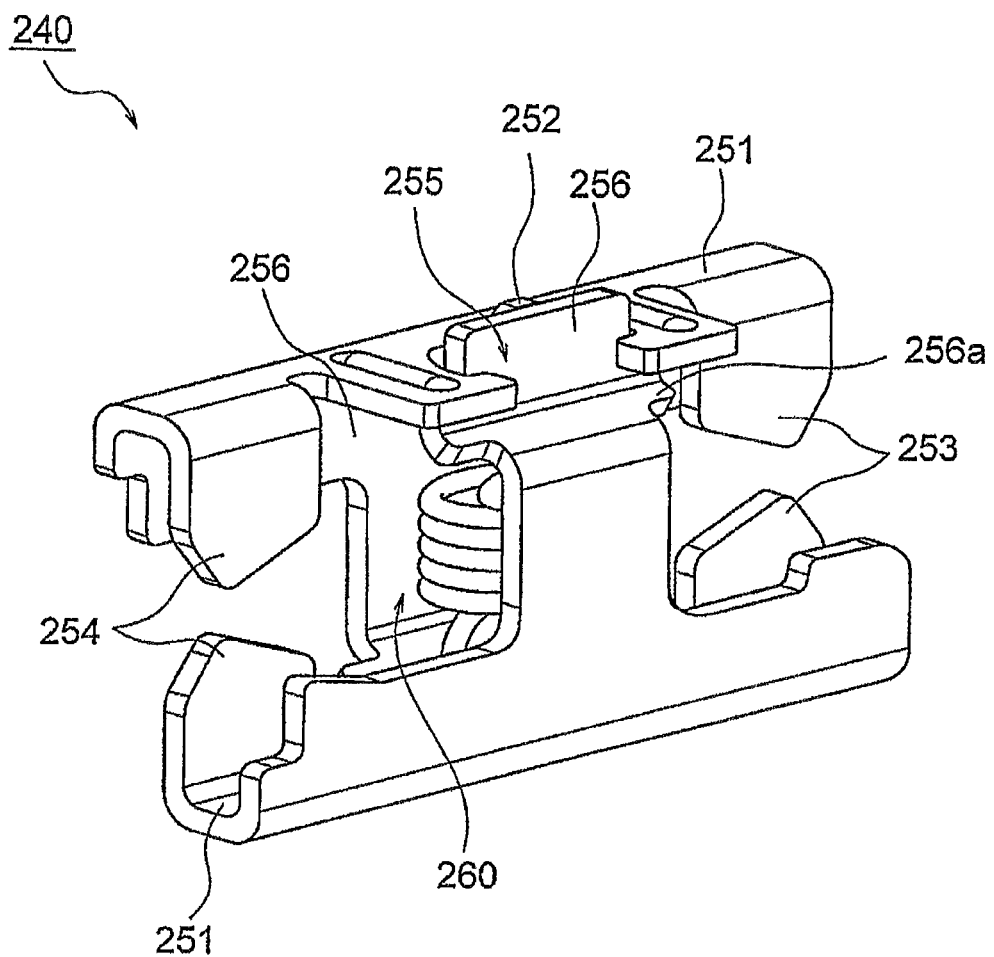
FIG. 14 is a perspective view showing a state of the contact of the third embodiment after assembly thereof.
Figure 15:
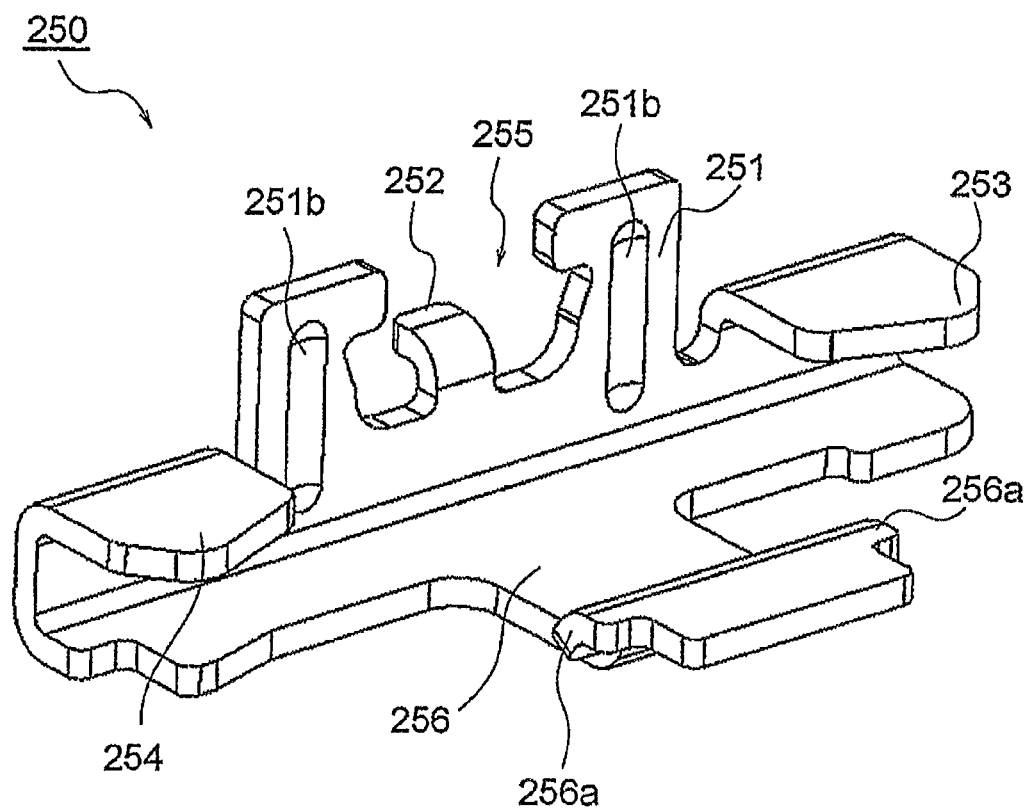
FIG. 15 is a perspective view showing a conductive member that forms the contact of the third embodiment.

As shown in FIG. 14, each contact 240 is configured such that, in the state where the biasing member 260 is attached to the pair of conductive members 250 and the free ends of the support portions 256 are inserted through and engaged with the attaching holes 255 formed in the base portions 251, the three-dimensional structure after the assembly is autonomously maintained.

Specifically, in this embodiment, in the assembled state of the contact 240, side surfaces, facing the other conductive members 250, of the protruding portions 256a and side surfaces, facing the other conductive members 250, of the base portions 251 respectively serve as abutting portions 258 that abut against each other in the second direction Y.

Herein, the state of the contact 240 having been assembled will be described in detail with reference to FIGS. 16A to 16C in three cases, i.e. when no connection object is inserted into the contact 240, when a connection object is inserted only between the second contact portions 254, and when a connection object is inserted only between the first contact portions 253.

While the case where the connection object is inserted only between the first contact portions 253 is not realized in this embodiment, it will virtually be described.

Figure 16A:
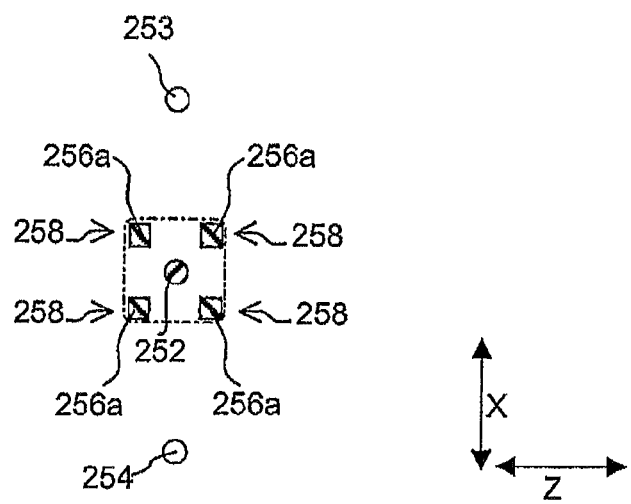
FIG. 16A is an explanatory diagram exemplarily showing the positional relationship between abutting portions, contact portions, and attaching portions as seen in a biasing direction in the state where no connection object is inserted into the contact.
Figure 16B:
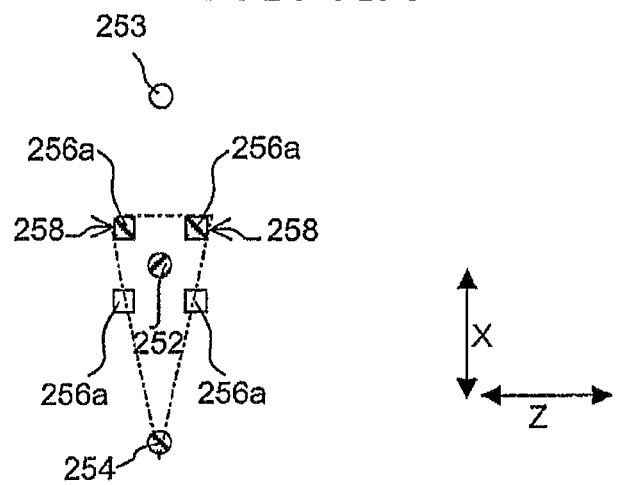
FIG. 16B is an explanatory diagram exemplarily showing the positional relationship between the abutting portions, the contact portions, and the attaching portions as seen in the biasing direction in the state where a connection object is inserted between the second contact portions.
Figure 16C:
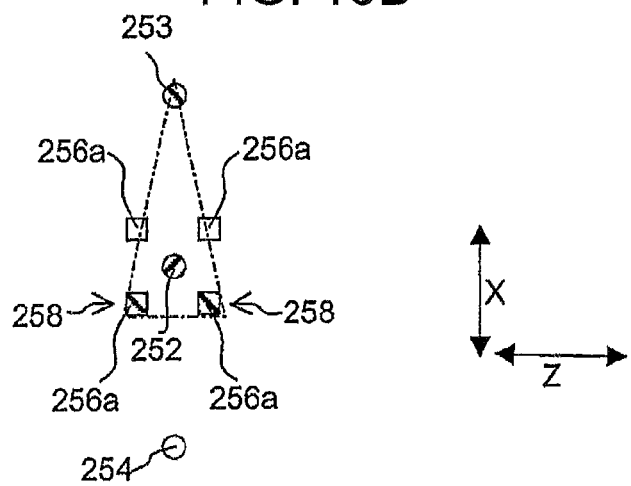
FIG. 16C is an explanatory diagram exemplarily showing the positional relationship between the abutting portions, the contact portions, and the attaching portions as seen in the biasing direction in the state where a connection object is inserted between the first contact portions.
Figure 17:
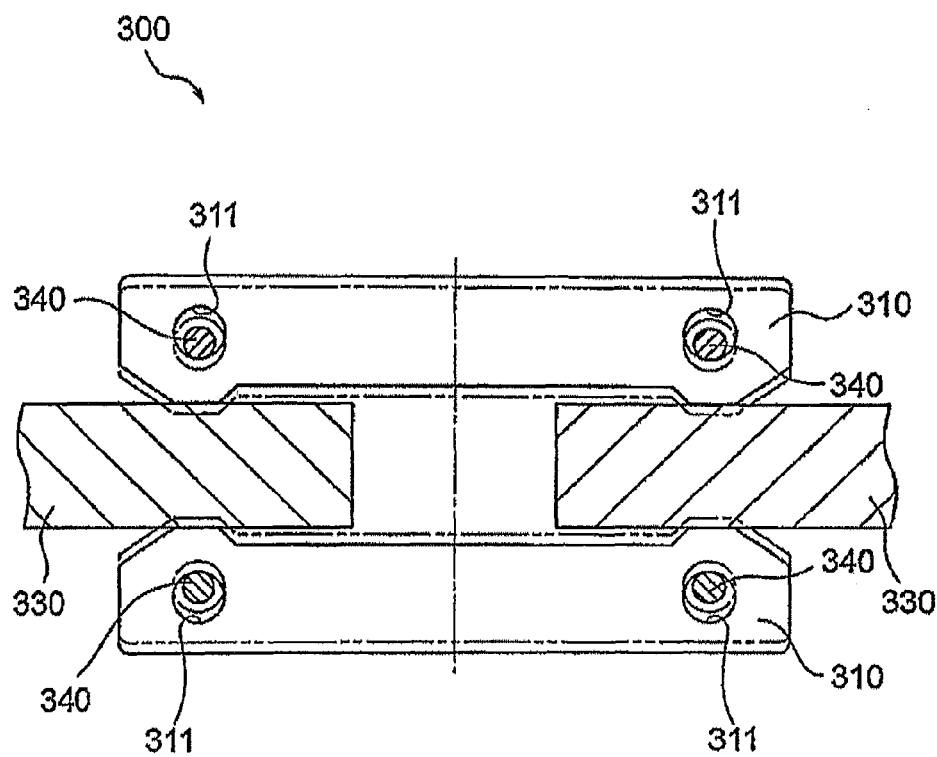
FIG. 17 is an explanatory diagram showing a conventional contact.
Figure 18:
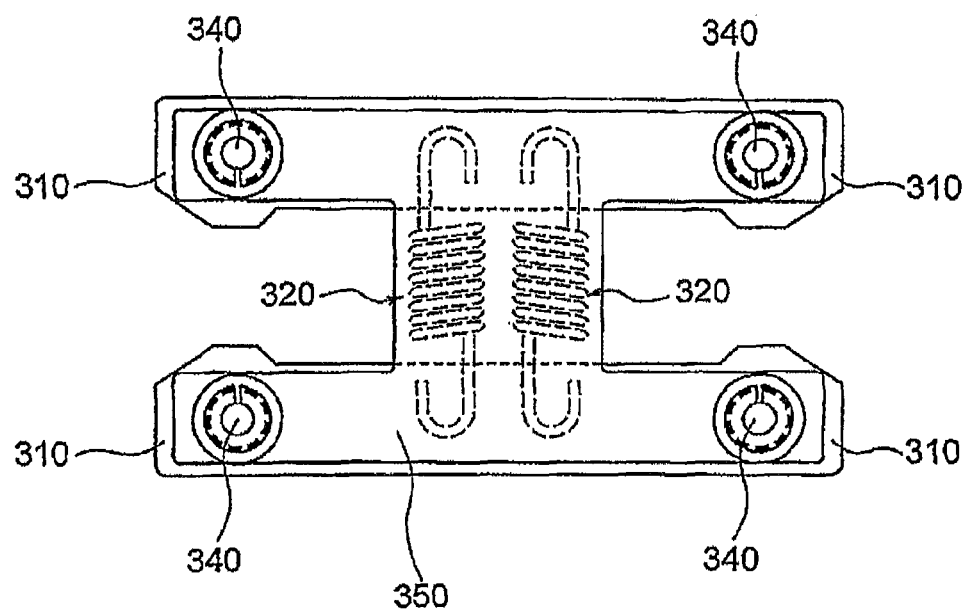
FIG. 18 is an explanatory diagram showing the conventional contact as seen from a position different from FIG. 17.

FIGS. 16A to 16C exemplarily show the positional relationships between the abutting portions 258, the first and second contact portions 253 and 254, and the attaching portions 252 as seen in the biasing direction of the biasing member 260 (second direction Y).

First, in the state where the contact 240 has been assembled and no connection object (bus bar 83, rack-side contact 91) is inserted into the contact 240, the side surfaces, facing the other conductive members 250, of the protruding portions 256a abut against the base portions 251 and serve as the abutting portions 258. In this state, as shown in FIG. 16A, the attaching portions 252 are located within a region defined by connecting the outermost points, with respect to the attaching portion 252, of the abutting portions 258 and therefore the relative posture between the pair of conductive members 250 can be maintained against the biasing force of the biasing member 260.

On the other hand, in the state where the contact 240 has been assembled and the connection object (bus bar 83) is inserted only between the second contact portions 254, the distance between the second contact portions 254 increases due to the insertion of the connection object so that the protruding portions 256a on the first contact portion 253 side abut against the base portions 251 and serve as the abutting portions 258. Also in this state, as shown in FIG. 16B, the attaching portions 252 are located within a region defined by connecting the outermost points, with respect to the attaching portion 252, of the abutting portions 258 and the second contact portion 254 and therefore the relative posture between the pair of conductive members 250 can be maintained against the biasing force of the biasing member 260.

On the other hand, in the state where the contact 240 has been assembled and the connection object (rack-side contact 91) is inserted only between the first contact portions 253, the distance between the first contact portions 253 increases due to the insertion of the connection object so that the protruding portions 256a on the second contact portion 254 side abut against the base portions 251 and serve as the abutting portions 258. Also in this state, as shown in FIG. 16C, the attaching portions 252 are located within a region defined by connecting the outermost points, with respect to the attaching portion 252, of the abutting portions 258 and the first contact portion 253 and therefore the relative posture between the pair of conductive members 250 can be maintained against the biasing force of the biasing member 260.

In this manner, the contact 240 of this embodiment is configured such that, in any of the cases where no connection object is inserted into the contact 240, where the connection object is inserted only between the second contact portions 254, and where the connection object is inserted only between the first contact portions 253, the relative posture between the pair of conductive members 250 can be maintained against the biasing force of the biasing member 260 while preventing an excessive load from being applied to portions forming later-described movement restricting portions 259 or the like and preventing smooth movement of the contact 240 from being impaired.

The curved inner surfaces of the attaching holes 255 and outer surfaces of the free ends of the support portions 256 respectively serve as the movement restricting portions 259 that abut against (face) each other in the first direction X and the third direction Z to thereby restrict the relative movement between the pair of conductive members 250 in the first direction X and the third direction Z.

Herein, the dimension, in the second direction Y, of each support portion 256 on its free end side with respect to the side surfaces (abutting portions 258), facing the other conductive member 250, of the protruding portions 256a is set so that the free ends of the support portions 256 abut against (face) the inner surfaces of the attaching holes 255 in the first direction X and the third direction Z in any of the cases where no connection object is inserted into the contact 240, where the connection object is inserted only between the second contact portions 254, where the connection object is inserted only between the first contact portions 253, and where the connection objects are inserted between the second contact portions 254 and between the first contact portions 253.

As described before, the position and posture (specifically, the position and posture in the plane defined by the first direction X and the second direction Y) of the contacts 240 in the contact receiving portion 70 are controlled by a first control portion 24 formed in the first housing 20 and a second control portion 34 formed in the second housing 30 while the position of the contacts 240 in the third direction Z in the contact receiving portion 70 is restricted by a first position restricting portion (not illustrated) formed in the first housing 20 and a second position restricting portion (not illustrated) formed in the second housing 30.

As shown in FIG. 14, the biasing member 260 is attached between the attaching portions 252 respectively formed in the pair of conductive members 250 and is disposed in a space defined by the base portions 251 and the support portions 256 respectively formed in the pair of conductive members 250 forming the contact 240.

Next, referring to FIGS. 13 and 14, an assembly method of the contact 240 will be described hereinbelow.

First, the conductive members 250 are disposed so as to be offset from each other in the third direction Z and then are moved so that the attaching portions 252 formed in the conductive members 250 approach each other to positions where both ends of the biasing member 260 can be engaged with the attaching portions 252.

Then, both ends of the biasing member 260 are engaged with the attaching portions 252 formed in the conductive members 250.

Then, the relative posture between the pair of conductive members 250 is adjusted to extend the biasing member 260 and then, as shown in FIG. 14, the free end of the support portion 256 of each of the conductive members 250 and the attaching hole 255 of the other conductive member 250 are engaged with each other, thereby completing assembly of the contact 240.

In this embodiment thus obtained, apart from the above-mentioned effects in the first embodiment, since the conductive members 250 have the movement restricting portions 259 that abut against each other in the first direction X and the third direction Z, it is possible to restrict the relative movement between the pair of conductive members 250 also in the third direction Z in addition to the first direction X.

In the above-mentioned embodiments, the description has been given assuming that a contact has a first contact portion for contact with one connection object and a second contact portion for contact with another connection object. However, in the case where a single connection object is fitted to a connector from the outside, a contact may be formed with only one contact portion.

In the above-mentioned embodiments, the description has been given assuming that part of a support portion formed in a conductive member of a contact serves as a movement restricting portion. However, a portion that serves as a movement restricting portion may be formed in a conductive member apart from a support portion.

In the above-mentioned embodiments, the description has been given assuming that a housing comprises a first housing and a second housing. However, it may be configured such that a contact is received in or held by a single housing.

In the above-mentioned embodiments, the description has been given assuming that a contact is entirely received in a contact receiving portion. However, the contact may partially protrude to the outside of the contact receiving portion.

In the above-mentioned embodiments, the description has been given assuming that a contact is a contact for power supply. However, it may be used as a signal contact.

DESCRIPTION OF SYMBOLS 10 connector
20 first housing
21 first receiving portion
22 first opening
23 slide guide portion
24 first control portion
26 signal housing holding portion
30 second housing
31 second receiving portion
32 second opening
33 attaching spring portion
34 second control portion
36 guide portion
40, 140, 240 contact
50, 150, 250 conductive member
51, 151, 251 base portion
151a hole
251b reinforcing portion
52, 152, 252 attaching portion
53, 153, 253 first contact portion
54, 154, 254 second contact portion
55, 155, 255 attaching hole
56, 156, 256 support portion (first support portion)
56a, 156a, 256a protruding portion (first protruding portion)
57 second support portion
57a second protruding portion
58, 158, 258 abutting portion
59, 159, 259 movement restricting portion
60, 160, 260 biasing member
70 contact receiving portion
71 signal housing
80 battery unit
81 casing
81a attaching opening
82 battery 83 bus bar (connection object)
84 spacer
85 bolt
90 rack-side connector
91 rack-side contact (another connection object)
92 rack-side housing
92a guide portion
X first direction
Y second direction
Z third direction

The invention claimed is:

1. A contact comprising a pair of conductive members and a biasing member attached between the pair of conductive members and biasing the pair of conductive members toward each other, the contact adapted to be connected to a connection object inserted between the pair of conductive members by holding the connection object therebetween,
   wherein the pair of conductive members each has a base portion and an attaching portion formed at the base portion and attached with the biasing member,
   wherein the base portion of one of the conductive members and the base portion of the other of the conductive members are disposed spaced apart from each other,
   wherein at least one of the pair of conductive members has a support portion extending from the base portion toward the other of the conductive members and abutting against the other of the conductive members to support the other of the conductive members,
   wherein the pair of conductive members each has a first contact portion for contact with the connection object and a second contact portion for contact with another connection object, the second contact portion formed on a side opposite to the first contact portion with respect to the attaching portion,
   wherein the first contact portion of one of the conductive members and the first contact portion of the other of the conductive members face each other in a biasing direction of the biasing member, and are biased by the biasing member toward each other, and
   wherein the second contact portion of one of the conductive members and the second contact portion of the other of the conductive members face each other in the biasing direction, and are biased by the biasing member toward each other.

2. The contact according to claim 1, wherein the pair of conductive members each has a movement restricting portion that abuts against a portion of the other of the conductive members in a direction different from the biasing direction to thereby restrict relative movement between the pair of conductive members in the direction different from the biasing direction.

3. The contact according to claim 1,
   wherein at least one of the pair of conductive members has a hole formed therethrough in the biasing direction,
   wherein the other of the conductive members has a protruding portion inserted into the hole in the biasing direction, and
   wherein an inner surface of the hole and an outer surface of the protruding portion serve as the movement restricting portions.

4. The contact according to claim 1, wherein the pair of conductive members have the same shape.

5. The contact according to claim 1, wherein the pair of conductive members are formed of a metal or an alloy having a conductivity of 50% or more assuming that a conductivity of pure copper is 100%.

6. The contact according to claim 1, wherein the conductive members each has a shape with no overlapping portion when developed on a plane.

7. The contact according to claim 1, wherein the pair of conductive members are formed so that, as seen in the biasing direction of the biasing member, the attaching portions are located within a region defined by connecting outermost points, with respect to the attaching portion, of abutting portions between the pair of conductive members in a state where no connection object is held by the contact.

8. The contact according to claim 1, wherein the pair of conductive members are formed so that, as seen in the biasing direction of the biasing member, the attaching portions are located within a region defined by connecting outermost points, with respect to the attaching portion, of abutting portions between the pair of conductive members and the second contact portion in a state where the another connection object is held between the second contact portions.

9. The contact according to claim 1, wherein the pair of conductive members are formed so that, as seen in the biasing direction of the biasing member, the attaching portions are located within a region defined by connecting outermost points, with respect to the attaching portion, of abutting portions between the pair of conductive members and the first contact portion in a state where the connection object is held between the first contact portions.

10. A connector comprising the contact according to claim 1.

* * * * *